(12) United States Patent
Kasperski

(10) Patent No.: US 9,734,251 B2
(45) Date of Patent: Aug. 15, 2017

(54) LOCALITY-SENSITIVE SEARCH SUGGESTIONS

(75) Inventor: Richard Kasperski, Creston (CA)

(73) Assignee: EXCALIBUR IP, LLC, Sunnyvale, CA (US)

( * ) Notice: Subject to any disclaimer, the term of this patent is extended or adjusted under 35 U.S.C. 154(b) by 727 days.

(21) Appl. No.: 12/686,166

(22) Filed: Jan. 12, 2010

(65) Prior Publication Data

US 2011/0173217 A1    Jul. 14, 2011

(51) Int. Cl.
*G06F 17/30* (2006.01)

(52) U.S. Cl.
CPC ...... *G06F 17/3087* (2013.01); *G06F 17/3064* (2013.01)

(58) Field of Classification Search
CPC .................. G06F 17/3064; G06F 17/3087
USPC ......................................................... 707/721
See application file for complete search history.

(56) References Cited

U.S. PATENT DOCUMENTS

| | | | |
|---|---|---|---|
| 6,564,213 B1 * | 5/2003 | Ortega et al. | |
| 6,701,309 B1 * | 3/2004 | Beeferman et al. | |
| 7,451,131 B2 * | 11/2008 | Curtis et al. | |
| 7,685,119 B2 * | 3/2010 | Riise et al. | 707/999.005 |
| 7,743,048 B2 * | 6/2010 | Baldwin | 707/713 |
| 7,774,002 B1 * | 8/2010 | Ortega et al. | 455/456.2 |
| 7,984,004 B2 * | 7/2011 | Andrew et al. | 706/45 |
| 8,856,115 B1 * | 10/2014 | Huffman et al. | 707/733 |
| 9,146,939 B1 * | 9/2015 | Zhdanovich | G06F 17/30241 |
| 2005/0065916 A1 * | 3/2005 | Ge | G06Q 30/0251 |
| 2005/0080786 A1 * | 4/2005 | Fish et al. | 707/10 |
| 2006/0271531 A1 * | 11/2006 | O'Clair | G06Q 30/0205 |
| 2008/0208847 A1 * | 8/2008 | Moerchen | G06F 17/30696 |
| 2008/0222119 A1 * | 9/2008 | Dai et al. | 707/4 |
| 2008/0243783 A1 * | 10/2008 | Santi | G06F 17/30241 |
| 2008/0307053 A1 * | 12/2008 | Mitnick | G06F 17/30241 709/205 |
| 2009/0132512 A1 * | 5/2009 | Kislyuk et al. | 707/5 |
| 2009/0138445 A1 * | 5/2009 | White | G06Q 30/02 |
| 2009/0265388 A1 * | 10/2009 | Xiao et al. | 707/104.1 |
| 2010/0082604 A1 * | 4/2010 | Gutt et al. | 707/721 |
| 2011/0010336 A1 * | 1/2011 | Johnson | G06F 17/30 707/609 |
| 2011/0137881 A1 * | 6/2011 | Cheng et al. | 707/706 |
| 2011/0167077 A1 * | 7/2011 | Govani et al. | 707/767 |

* cited by examiner

*Primary Examiner* — William Spieler
(74) *Attorney, Agent, or Firm* — Pillsbury Winthrop Shaw Pittman LLP

(57) ABSTRACT

Techniques are described herein for providing locality-sensitive search suggestions. When users issue search queries, the localities of the users who issue those search queries are associated with the search queries. The users may be grouped into populations, such that each population has a locality that corresponds to the localities of the users in that population. The issuances of the search queries induce a distribution of interest with respect to the issued search queries among the populations. A subset (e.g., one or more) of the issued search queries is suggested to a user who provides a search query (e.g., a preliminary search query or an issued search query), which is deemed to be relevant to the subset of the issued search queries, based on the distribution of interest.

21 Claims, 27 Drawing Sheets

LOCALITY-SENSITIVE SEARCH SUGGESTIONS

BACKGROUND OF THE INVENTION

Field of the Invention

The present invention generally relates to Web searching. In particular, the present invention is related to techniques for providing search suggestions that are sensitive to locality.

Background

A Web server is a computer (e.g., server) or other processing system that is configured to execute a software program that provides information to users in response to receiving hypertext transfer protocol (HTTP) requests from users. For example, the information may include Web pages, images, other types of files, output of executables residing on the Web server, etc. The information may be provided in the form of Web pages, such as hypertext markup language (HTML) documents and objects (e.g., files) that are linked therein, for example.

One type of software program that may be executed by a Web server is a Web search engine. A Web search engine searches for information on the World Wide Web (WWW) based on search queries that are issued (i.e., executed) by users. For instance, a Web search engine may match keywords that are included in a user's search query to metadata associated with Web sites. The Web sites are ranked based on how closely their metadata matches the keywords. A list of the Web sites is provided to the user in an order corresponding to the rankings of the respective Web sites. The list of the Web sites is commonly referred to as the search results. For example, the Web site having the highest ranking is usually listed first in the search results.

Some Web search engines are capable of suggesting search queries to a user with regard to a search query that is provided by the user. The suggested search queries are commonly referred to as search suggestions. For example, a Web search engine may provide a list of search suggestions that are related to the user's search query before the user issues the search query (e.g., as the user types the search query). A user's search query that is initiated (e.g., by typing at least a portion of the search query) but has not been issued by the user is referred to herein as a preliminary search query. In another example, the search suggestions may be provided after the user issues the search query.

Search suggestions are often generated based merely on words that are included in the user's search query. For example, locality may not be taken into consideration with regard to the search suggestions unless the locality happens to be included in the user's search query. Some conventional search suggestion techniques take into consideration the user's location to provide search suggestions that correspond to establishments that are located near the user's location. However, such search suggestions may not necessarily be useful to the user. For instance, just because an establishment exists in a location near the user's location (e.g., in the user's neighborhood) does not necessarily mean that the establishment will be of interest to the user.

Thus, systems, methods, and computer program products are needed that are capable of providing locality-sensitive search suggestions while addressing one or more of the aforementioned shortcomings of convention search suggestion techniques.

BRIEF SUMMARY OF THE INVENTION

Various approaches are described herein for, among other things, providing search suggestions that are sensitive to locality. A locality is a geographic area. A locality may be a city, county, state, country, or any portion and/or combination thereof. The locality may include disconnected land masses and/or satellite states. For instance, a locality may be designated using a zip code, a postal code, latitude and longitude, or any other suitable means. Some commonly known examples of localities include but are not limited to the San Francisco Bay area; the northeastern portion of the United States; the South of France; Silicon Valley in California; the region defined by Virginia, Maryland, and the District of Columbia; the area defined by the United States zip code 90210; the United States including all United States territories; etc.

Each search query that is issued by a user is associated with a locality of that user. Users may be grouped into populations. A population may include any suitable number of users (e.g., 1, 2, 3, etc.). Each population has a population locality that corresponds to the user localit(ies) of the respective user(s) in that population. The issuances of the search queries induce a distribution of interest with respect to the issued search queries among the populations. A subset (e.g., one or more) of the issued search queries is suggested to a user who provides a search query (e.g., a preliminary search query or an issued search query), which is deemed to be relevant to the subset of the issued search queries, based on the distribution of interest.

Accordingly, the distribution of interest may be used to determine how useful a search suggestion is likely to be to a user. For example, the distribution of interest may indicate that the subset of the issued search queries is more likely to be issued by users in the population than by users in another population. In another example, the distribution of interest may indicate that the users in the population are more likely to issue the subset of the issued search queries than other issued search queries that are deemed to be relevant to the user's search query. The likelihood of a search suggestion being useful to a user may be based on any of a variety of factors, including but not limited to a number of times the corresponding search query is issued, a frequency with which the corresponding search query is issued, etc.

Example methods are described for providing locality-sensitive search suggestions. A first example method is described in which search queries are associated with localities of users who issue the search queries. The localities of the users are matched to localities of populations among which the users are distributed. Cumulative interest of the users in each population is determined with respect to each search query. At least some of the search queries are suggested to a user having a locality that matches a locality of a population based on the cumulative interest of the users in that population with respect to each of the suggested search queries.

A second example method is described in which a search query is associated with localities of users who issue the search query. The users are assigned among populations based on correlations between the localities of the users and the localities of the populations. A localization of instances of the search query with respect to a locality of a population is determined based on a geographic distribution of the issuances of the search query among the localities of the populations. The search query is suggested to a user based on the correlation between the locality of the user and the locality of the population with respect to which the localization of the instances of the search query is determined.

Example systems are also described. A first example system includes an association module, a locality matching module, an interest determination module, and a suggestion module. The association module is configured to associate search queries with localities of users who issue the search queries. The locality matching module is configured to match the localities of the users to localities of populations among which the users are distributed. The interest determination module is configured to determine cumulative interest of the users in each population with respect to each search query. The suggestion module is configured to suggest at least some of the search queries to a user having a locality that matches a locality of a population based on the cumulative interest of the users in that population with respect to each of the suggested search queries.

A second example system includes an association module, an assignment module, a localization determination module, and a suggestion module. The association module is configured to associate a search query with localities of users who issue the search query. The assignment module is configured to assign the users among populations based on correlations between the localities of the users and the localities of the populations. The localization determination module is configured to determine a localization of instances of the search query with respect to a locality of a population based on a geographic distribution of the issuances of the search query among the localities of the populations. The suggestion module is configured to suggest the search query to a user based on the correlation between the locality of the user and the locality of the population with respect to which the localization of the instances of the search query is determined.

Computer program products are also described. A first computer program product includes a computer-readable medium having computer program logic recorded thereon for providing locality-sensitive search suggestions. The computer program logic includes first, second, third, and fourth program logic modules. The first program logic module is for enabling the processor-based system to associate search queries with localities of users who issue the search queries. The second program logic module is for enabling the processor-based system to match the localities of the users to localities of populations among which the users are distributed. The third program logic module is for enabling the processor-based system to determine cumulative interest of the users in each population with respect to each search query. The fourth program logic module is for enabling the processor-based system to suggest at least some of the search queries to a user having a locality that matches a locality of a population based on the cumulative interest of the users in that population with respect to each of the suggested search queries.

A second computer program product includes a computer-readable medium having computer program logic recorded thereon for providing locality-sensitive search suggestions. The computer program logic includes first, second, third, and fourth program logic modules. The first program logic module is for enabling the processor-based system to associate a search query with localities of users who issue the search query. The second program logic module is for enabling the processor-based system to assign the users among populations based on correlations between the localities of the users and the localities of the populations. The third program logic module is for enabling the processor-based system to determine a localization of instances of the search query with respect to a locality of a population based on a geographic distribution of the issuances of the search query among the localities of the populations. The fourth program logic module is for enabling the processor-based system to suggest the search query to a user based on the correlation between the locality of the user and the locality of the population with respect to which the localization of the instances of the search query is determined.

Further features and advantages of the disclosed technologies, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 1 is a block diagram of an example computer system in accordance with an embodiment described herein.

FIGS. 2, 5, 6, 8, 10, 12, 14, 16, 18, 21, 23, and 25 depict flowcharts of methods for providing locality-sensitive search suggestions in accordance with embodiments described herein.

FIGS. 3, 7, 9, 11, 13, 15, 17, 19, 22, 24, and 26 are block diagrams of example implementations of a Web server shown in FIG. 1 in accordance with embodiments described herein.

Figure 1:
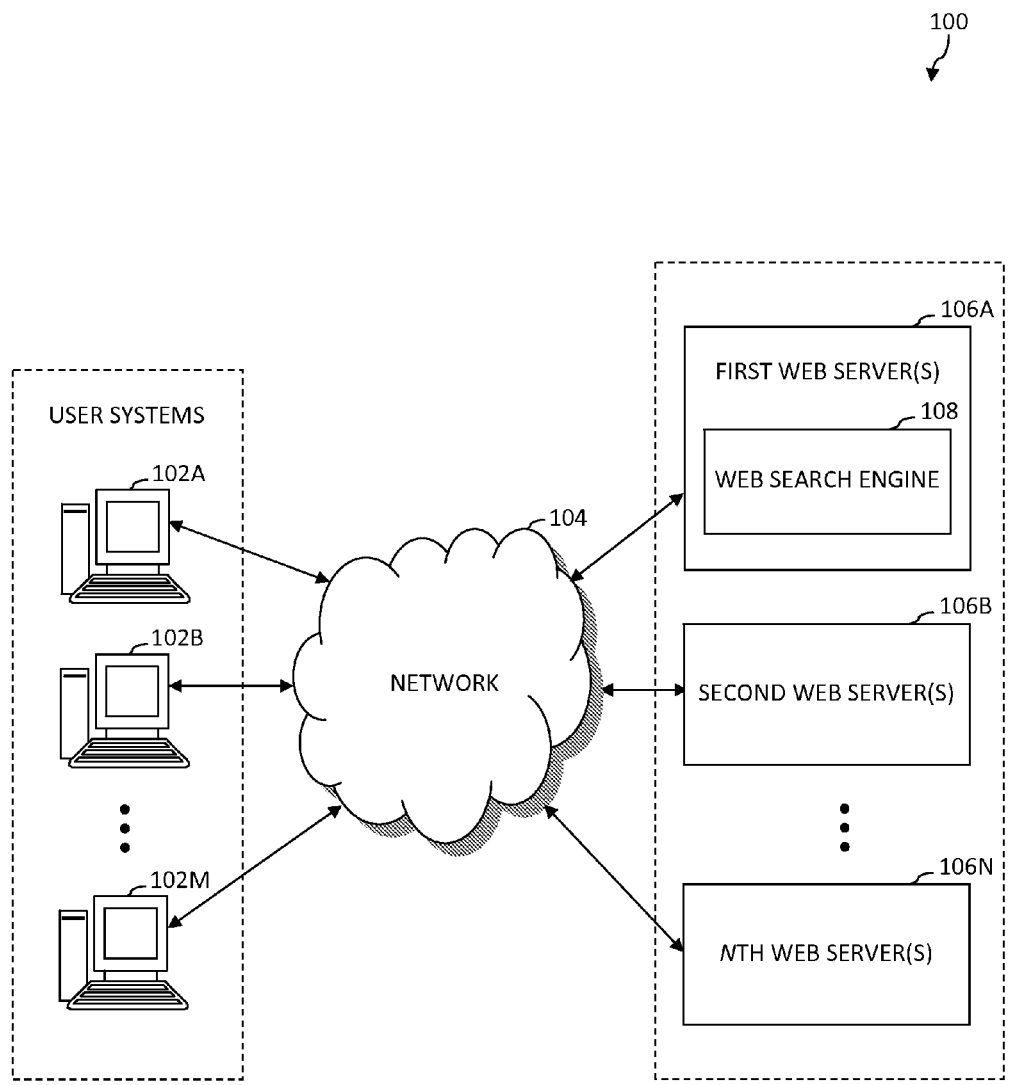

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Example embodiments are capable of providing search suggestions that are sensitive to locality. A locality is a geographic area. A locality may be a city, county, state, country, or any portion and/or combination thereof. The locality may include disconnected land masses and/or satellite states. For instance, a locality may be designated to correspond to a zip code, a postal code, latitude and longitude, or any other suitable indication of a geographic area. Some commonly known examples of localities include but are not limited to the San Francisco Bay area; the northeastern portion of the United States; the South of France; Silicon Valley in California; the region defined by Virginia, Maryland, and the District of Columbia; the area defined by the United States zip code 90210; the United States including all United States territories; etc.

In accordance with example embodiments, each search query that is issued by a user is associated with a locality of that user. Users are grouped into populations. A population may include any suitable number of users (e.g., 1, 2, 3, etc.). Each population has a population locality that corresponds to the user localit(ies) of the respective user(s) in that population. The issuances of the search queries induce a distribution of interest with respect to the issued search queries among the populations. Example embodiments suggest a subset (e.g., one or more) of the issued search queries to a user who provides a search query (e.g., a preliminary search query or an issued search query), which is deemed to be relevant to the subset of the issued search queries, based on the distribution of interest.

Accordingly, the distribution of interest may be used to determine how useful a search suggestion is likely to be to a user. For example, the distribution of interest may indicate that the subset of the issued search queries is more likely to be issued by users in the population than by users in another population. In another example, the distribution of interest may indicate that the users in the population are more likely to issue the subset of the issued search queries than other issued search queries that are deemed to be relevant to the user's search query. The likelihood that a search suggestion is useful to a user may be based on any of a variety of factors, including but not limited to a number of times the corresponding search query is issued by users in the population, a frequency with which the corresponding search query is issued by users in the population, etc.

II. Example Embodiments for Providing Locality-Sensitive Search Suggestions

FIG. 1 is a block diagram of an example computer system 100 in accordance with an embodiment described herein. Generally speaking, computer system 100 operates to provide information to users in response to hypertext transfer protocol (HTTP) requests provided by the users. The information may include Web pages, images, other types of files, output of executables, etc. In accordance with example embodiments, computer system 100 operates to provide locality-sensitive search suggestions to users in response to search queries provided by the users. Further detail regarding techniques for providing locality-sensitive search suggestions is provided in the following discussion.

As shown in FIG. 1, computer system 100 includes a plurality of user systems 102A-102M, a network 104, and a plurality of Web servers 106A-106N. Communication among user systems 102A-102M and Web servers 106A-106N is carried out over network 104 using well-known network communication protocols. Network 104 may be a wide-area network (e.g., the Internet), a local area network (LAN), another type of network, or a combination thereof.

User systems 102A-102M are computers or other processing systems, each including one or more processors, that are capable of communicating with Web servers 106A-106N. User systems 102A-102M are capable of accessing Web sites hosted by Web servers 104A-104N, so that user systems 102A-102M may access information that is available via the websites. User systems 102A-102M are configured to provide HTTP requests to Web servers 106A-106N for requesting information stored on (or otherwise accessible via) Web servers 106A-106N. For instance, a user may initiate an HTTP request for information using a Web crawler, a Web browser, or other client deployed on a user system 102 that is owned by or otherwise accessible to the user.

Web servers 106A-106N are computers or other processing systems, each including one or more processors, that are capable of communicating with user systems 102A-102M. Web servers 106A-106N are configured to host respective Web sites, so that the Web sites are accessible to users of computer system 100. Web servers 106A-106N are further configured to execute software programs that provide information to users in response to receiving hypertext transfer protocol (HTTP) requests from users. For example, the information may include Web pages, images, other types of files, output of executables residing on the Web servers, etc. The software programs that are executing on Web servers 106A-106N may provide Web pages that include interface elements (e.g., buttons, hyperlinks, etc.) that a user may select for accessing the other types of information. The Web pages may be provided as hypertext markup language (HTML) documents and objects (e.g., files) that are linked therein, for example.

One type of software program that may be executed by any one or more of Web servers 106A-106N is a Web search engine. A Web search engine searches for information on the World Wide Web (WWW) based on search queries that are provided by users. First Web server(s) 106A is shown to include Web search engine 108 for illustrative purposes. For instance, Web search engine 108 may search among Web servers 106A-106N for requested information. Upon discovering instances of information that are relevant to a search query, Web search engine 108 ranks the instances based on their relevance to the search query. Web search engine 108 provides a list that includes each of the instances in an order that is based on the respective rankings of the instances. The list may be referred to as the search results corresponding to the search query.

In accordance with example embodiments, Web search engine 108 is configured to provide locality-sensitive search suggestions. When a user issues a search query, Web search engine 108 associates a locality of the user with the search query. For instance, Web search engine 108 may tag the search query with the locality of the user. A tag is a type of metadata that enables a locality of a user that is represented by the tag to be found in accordance with a browsing or searching operation. Persons skilled in the relevant art(s) will recognize that any suitable type of metadata may be used to represent a locality.

Web search engine 108 may determine the locality of the user in any of a variety of ways. For example, the user may have provided the user's locality upon opening an account with a provider of Web search engine 108. In accordance with this example, Web search engine 108 may review a database entry that is associated with the user to determine the user's locality. In another example, Web search engine 108 may request that the user provide the user's locality in conjunction with the user's search query. In yet another example, Web search engine 108 may infer the locality of the user from an identifier that is associated with the user, such as the user's Internet Protocol (IP) address or the like. In still another example, Web search engine 108 may receive a locality indicator that specifies the user's locality (e.g., latitude and longitude) from a user system (e.g., any of user systems 102A-102M) that is in the possession of (or is otherwise accessible to) the user. In accordance with this example, the locality indicator may (or may not) specify a direction in which the user is facing.

Users are grouped into populations, such that each population has a population locality that corresponds to the user localities of the respective users in that population. Web search engine 108 associates the search queries that are issued by the users in each population with the population locality of that population to generate respective query-locality pairs. For instance, Web search engine 108 may tag each of the search queries issued by users in a population with the population locality of that population.

Over time, Web search engine 108 may generate a relatively substantial collection of query-locality pairs. When the collection of query-locality pairs becomes sufficiently comprehensive, Web search engine 108 may determine the likelihood of a search query being issued with respect to a population (or the population locality of that population). For instance, the collection of query-locality pairs may be interpreted as a geographic distribution of query issuances among the populations (and corresponding population localities).

When a user initiates or issues a search query, Web search engine 108 determines a population having a population locality that corresponds to the locality of the user. For instance, the population locality may overlap with the locality of the user, may be within a designated distance from the locality of the user, may be the same as the locality of the user, etc. Web search engine 108 determines search queries that have been issued by users in that population and that are relevant to the search query initiated or issued by the user. Web search engine 108 determines the likelihood of each of the relevant search queries being issued with respect to the population. Web search engine 108 suggests one or more of the relevant search queries based on the likelihood of each of the relevant search queries being issued with respect to the population.

For example, Web search engine 108 may suggest relevant search queries that have a likelihood that exceeds a threshold to the user. In another example, Web search engine 108 may suggest a designated number n of the relevant search queries having the highest n likelihoods of being issued with respect to the population. In yet another example, Web search engine 108 may suggest relevant search queries that are more likely to be issued with respect to the population than with respect to other populations. In still another example, Web search engine 108 may suggest the relevant search queries that the users in the population are more likely to issue than other relevant search queries.

It will be recognized that any one or more user systems 102A-102M may communicate with any one or more Web servers 106A-106N. Although user systems 102A-102M are depicted as desktop computers in FIG. 1, persons skilled in the relevant art(s) will appreciate that user systems 102A-102M may include any client-enabled system or device, including but not limited to a laptop computer, a personal digital assistant, a cellular telephone, or the like.

Figure 2:
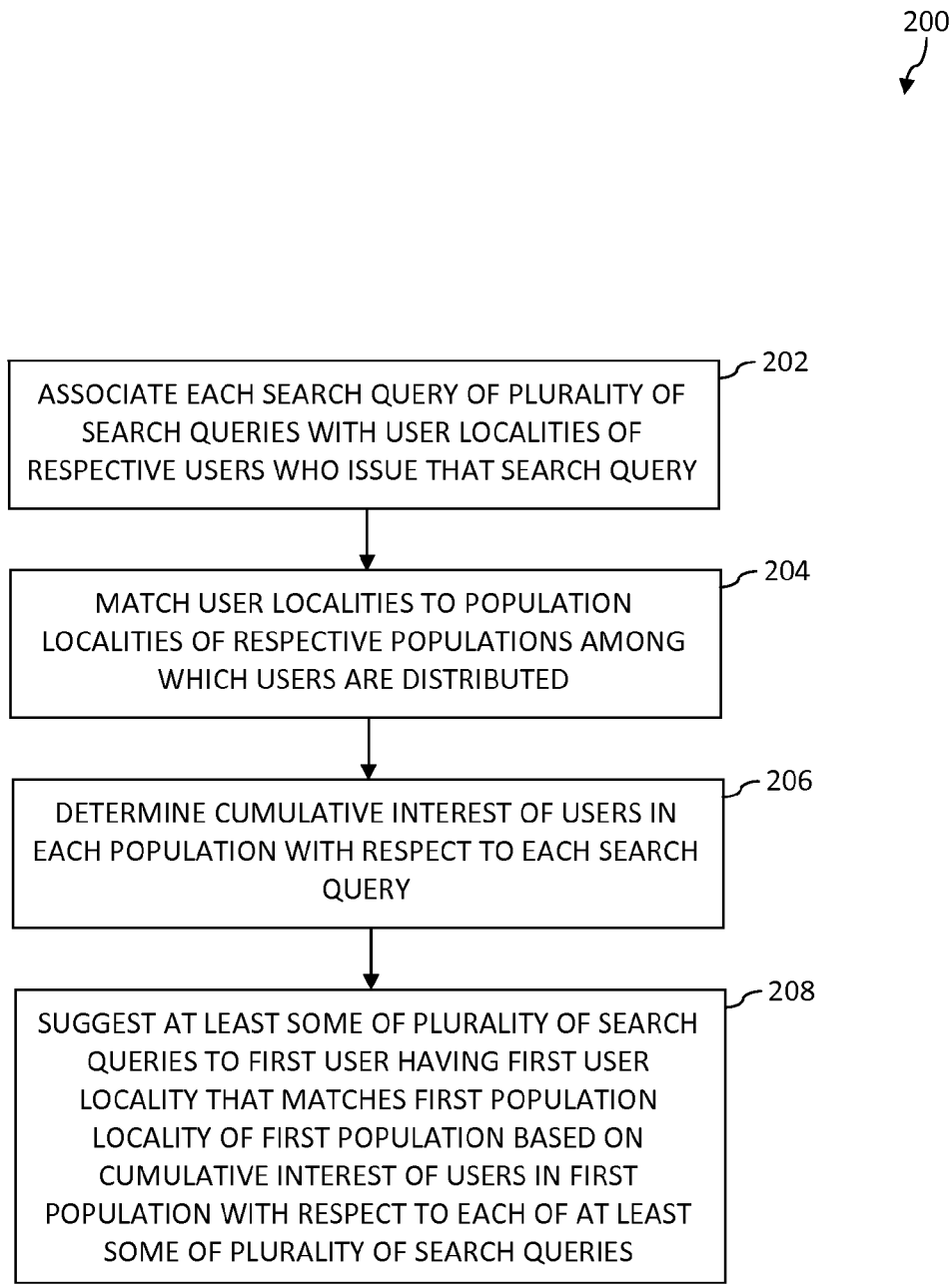

FIG. 2 depicts a flowchart 200 of a method for providing locality-sensitive search suggestions in accordance with an embodiment described herein. Flowchart 200 may be performed by any one or more of Web servers 106A-106N of computer system 100 shown in FIG. 1, for example. For illustrative purposes, flowchart 200 is described with respect to a Web server 106' shown in FIG. 3, which is an example of a Web server 106, according to an embodiment. In this document, whenever a prime is used to modify a reference number, the modified reference number indicates an example (or alternate) implementation of the element that corresponds to the reference number.

Figure 3:
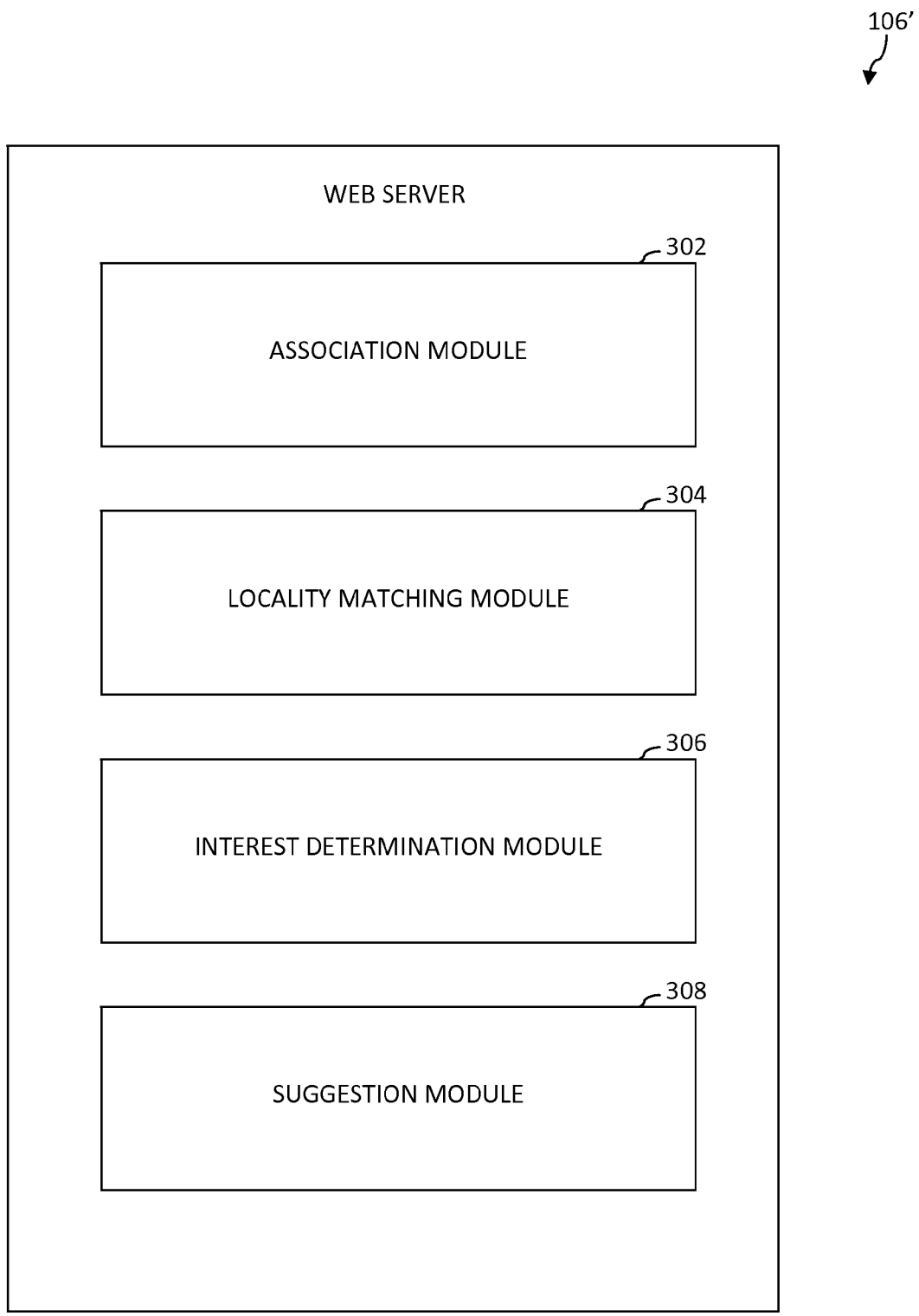

As shown in FIG. 3, Web server 106' includes an association module 302, a locality matching module 304, an interest determination module 306, and a suggestion module 308. Further structural and operational embodiments will be apparent to persons skilled in the relevant art(s) based on the discussion regarding flowchart 200. Flowchart 200 is described as follows.

As shown in FIG. 2, the method of flowchart 200 begins at step 202. In step 202, each search query of a plurality of search queries is associated with user localities of respective users who issue that search query. In an example implementation, association module 302 associates each search query with the user localities of the respective users who issue that search query. For instance, association module 302 may update metadata that is associated with each search query to include the user localities of the respective users who issue that search query. The updated metadata of each search query may include one or more tags that include the user localities of the respective users, though the scope of the example embodiments is not limited in this respect.

At step 204, the user localities are matched to population localities of respective populations among which the users are distributed. For instance, the user localities may be matched to the respective population localities based on the user localities being included in the respective population localities. In an example implementation, locality matching module 304 matches the user localities to the population localities.

At step 206, cumulative interest of the users in each population is determined with respect to each search query. For example, the cumulative interest of the users in a population with respect to a search query may be based on a number of times that the search query is issued by the users in the population, the frequency with which the users in the population issue the search query, the probability that the search query will be issued by users in the population (e.g., with respect to other search queries and/or other populations), etc. In an example implementation, interest determination module 306 determines the cumulative interest of the users in each population.

At step 208, at least some of the plurality of search queries are suggested to a first user having a first user locality that matches a first population locality of a first population based on the cumulative interest of the users in the first population with respect to each of the at least some of the plurality of search queries. For instance, the cumulative interest of the users in the first population may be used to bias the search suggestions toward those search queries that correspond to a relatively high cumulative interest. In an example implementation, suggestion module 308 suggests at least some of the plurality of search queries to the first user. Suggestion module 308 may suggest the at least some of the plurality of search queries to the first user in an order that is based on the cumulative interest of the users in the first population with respect to each of the at least some of the plurality of search queries, though the scope of the example embodiments is not limited in this respect.

Figure 4:
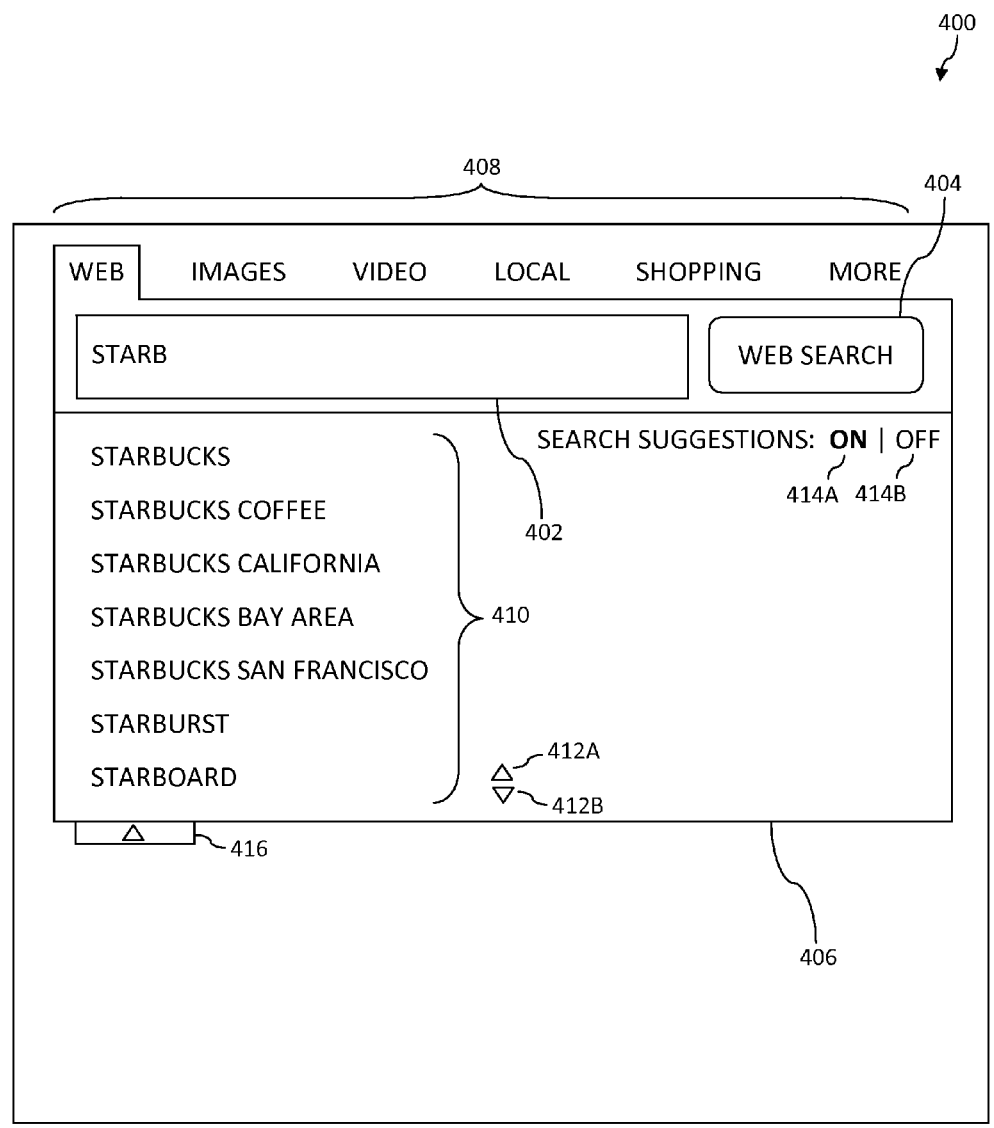
FIG. 4 is an illustration of an example graphical user interface (GUI) in accordance with an embodiment described herein.

FIG. 4 is an illustration of an example graphical user interface (GUI) 400 in accordance with an embodiment described herein. As shown in FIG. 4, GUI 400 includes a search window 402, a query issuance button 404, and search suggestion window 406. Search window 402 enables a user to provide a search query. The search query "STARB" is shown in search window 402 for illustrative purposes. Query issuance button 404 enables a user to issue (i.e., execute) a search query that is provided in search window 402. For instance, selecting (e.g., clicking) query issuance button 404 causes a Web search engine to perform a Web search based on the search query that is provided in search window 402.

Context indicators 408 indicate respective contexts in which a Web search may be performed in response to a user selecting query issuance button 404. The "WEB" context indicator is shown to be selected in FIG. 4 for illustrative purposes. The WEB context indicator causes the Web search engine to provide search results that include files having any suitable file type and hosted by any suitable Web site. The IMAGES context indicator causes the Web search engine to provide search results that correspond to image files. The VIDEO context indicator causes the Web search engine to provide search results that correspond to video files. The LOCAL context indicator causes the Web search engine to provide search results that correspond to businesses, attractions, etc. that are in the same general vicinity as the user. The SHOPPING context indicator causes the Web search engine to provide search results that correspond to products that are available for purchase.

When the user provides a search query (e.g., "STARB" in this example) in search window 402, the Web search engine determines a plurality of search queries that may be relevant to the user's search query. The search queries that are deemed to be most relevant to the user's search query are provided as search suggestions 410 in search suggestion window 406. The relevance of at least one of the search queries is determined based on the likelihood of the search quer(ies) to be issued by users in a population having a population locality that is associated with the user's locality.

In accordance with some example embodiments, the Web search engine may initially designate the population locality to be the same as the user's locality, a region within the user's locality, or a region that includes the user's locality. The Web search engine may change the designated population locality based on the extent of data that is available for determining the likelihood of the search quer(ies) to be issued by the users in the population having the initially designated population locality.

For example, if the available data is insufficient for the Web search engine to determine the likelihood of the search quer(ies) to be issued by the users in the population having the initially designated population locality, a population locality having a geographic area greater than that of the initially designated population locality may be designated. For instance, the amount of data that is available for determining the likelihood of the search quer(ies) to be issued by users in the population having the larger updated population locality may be greater than the amount of data that is available for determining the likelihood of the search quer(ies) to be issued by the users in the population having the initially designated population locality.

In another example, if the available data is voluminous, a population locality having a geographic area that is less than the initially designated population locality may be designated. For instance, the amount of data that is available for determining the likelihood of the search quer(ies) to be issued by users in the population having the updated population locality may be less than the amount of data that is available for determining the likelihood of the search quer(ies) to be issued by the users in the population having the initially designated population locality. Accordingly, the data regarding the updated population locality may be more localized in scope with respect to the user's locality than the data regarding the initially designated population locality. Designating a population locality that has a geographic area that is less than the geographic area of the initially designated population locality may therefore increase the likelihood that the resulting search suggestions will be useful to the user.

For purposes of illustration, assume that the user who provides the search query "STARB" in search window 402 lives in Oakland, Calif. Accordingly, the Web search engine determines locality-sensitive search suggestions based on a population locality that is associated with the user's locality of Oakland, Calif. For instance, the population locality may be designated as "northern California", "San Francisco Bay area", "Oakland, Calif.", "California", "West Coast", "Alameda County", or any other suitable population locality.

As shown in FIG. 4, the list of search suggestions 410 in search suggestion window 406 includes "STARBUCKS", "STARBUCKS COFFEE", "STARBUCKS CALIFORNIA", "STARBUCKS BAY AREA", "STARBUCKS SAN FRANCISCO", "STARBURST", and "STARBOARD". It will be recognized that "STARBUCKS", "STARBUCKS COFFEE", "STARBURST", and "STARBOARD" are conventional search suggestions; whereas, "STARBUCKS CALIFORNIA", "STARBUCKS BAY AREA", and "STARBUCKS SAN FRANCISCO" are locality-sensitive search suggestions, which are provided based on the likelihoods that these respective search queries have been issued by users in the designated population locality.

The inclusion and/or order of the conventional search suggestions and locality-based search suggestions that are shown in the list of search suggestions 410 may be based on any of a variety of factors, including but not limited to relevance of the search suggestions to the user's search query, likelihood of the search suggestions being issued by users in the designated population locality, likelihood of the search suggestions being issued in general, etc.

Suggestion window 406 includes scroll elements 412A and 412B, which enable the user to scroll through search suggestions that are not presently shown in suggestion window 406. For example, the user may select (e.g., click) scroll element 412A to reveal search suggestions that are above the "STARBUCKS" search suggestion. As the list of search suggestions 410 moves down in search suggestion window 406 to reveal a search suggestion above "STARBUCKS", a respective search suggestion is removed from the bottom of the list of search suggestions 410. In another example, the user may select scroll element 412B to reveal search suggestions that are below the "STARBOARD"

search suggestion. As the list of search suggestions 410 moves up in search suggestion window 406 to reveal a search suggestion below "STARBOARD", a respective search suggestion is removed from the top of the list of search suggestions 410.

Search suggestion control indicators 414A and 414B indicate whether the capability of the Web search engine to provide search suggestions is turned on or off. For example, the user may select indicator 414A to turn the search suggestion capability of the Web search engine on. In another example, the user may select indicator 414B to turn the search suggestion capability of the Web search engine off. Search suggestion display button 416 controls whether the search suggestions are shown or hidden. When the search suggestions are being shown, the user may select search suggestion display button 416 to hide the search suggestions. When the search suggestions are being hidden, the user may select search suggestion display button 416 to show the search suggestions.

The search query in search window 402 is shown to be lexically included in each of the search terms in the list of search terms 410 for illustrative purposes and is not intended to be limiting. The search query in search window 402 may be related to the search terms in the list of search terms 410 in any suitable manner. For example, search suggestions may be provided to a user based on the subject matter of the search query that is included in search window 402. In accordance with this example, the search query in search window 402 may be "HARDWARE STORE", and the list of search suggestions 410 may include "HOME DEPOT #1007", "LOWE'S SUNNYVALE", etc.

Figure 5:
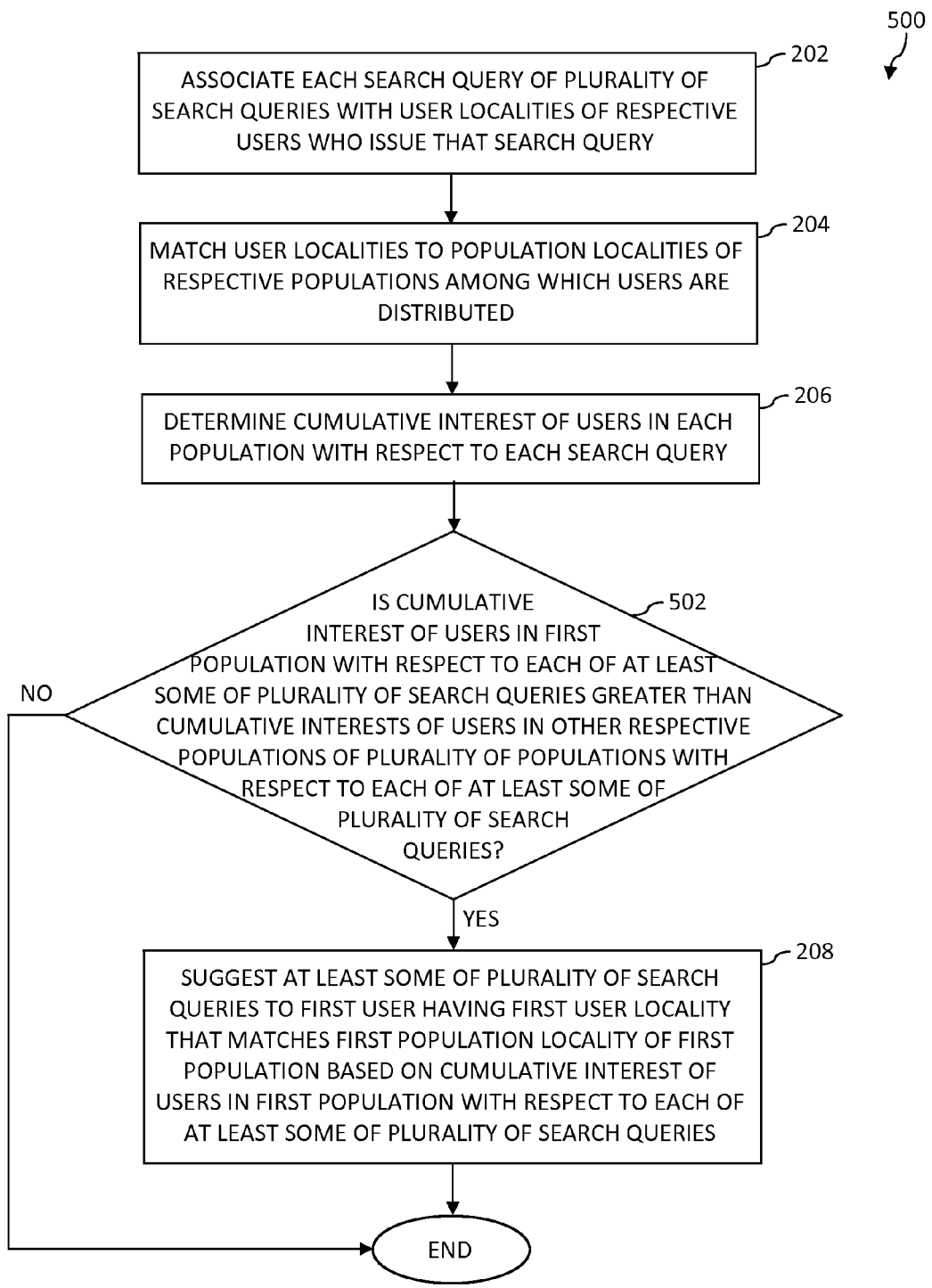
Figure 6:
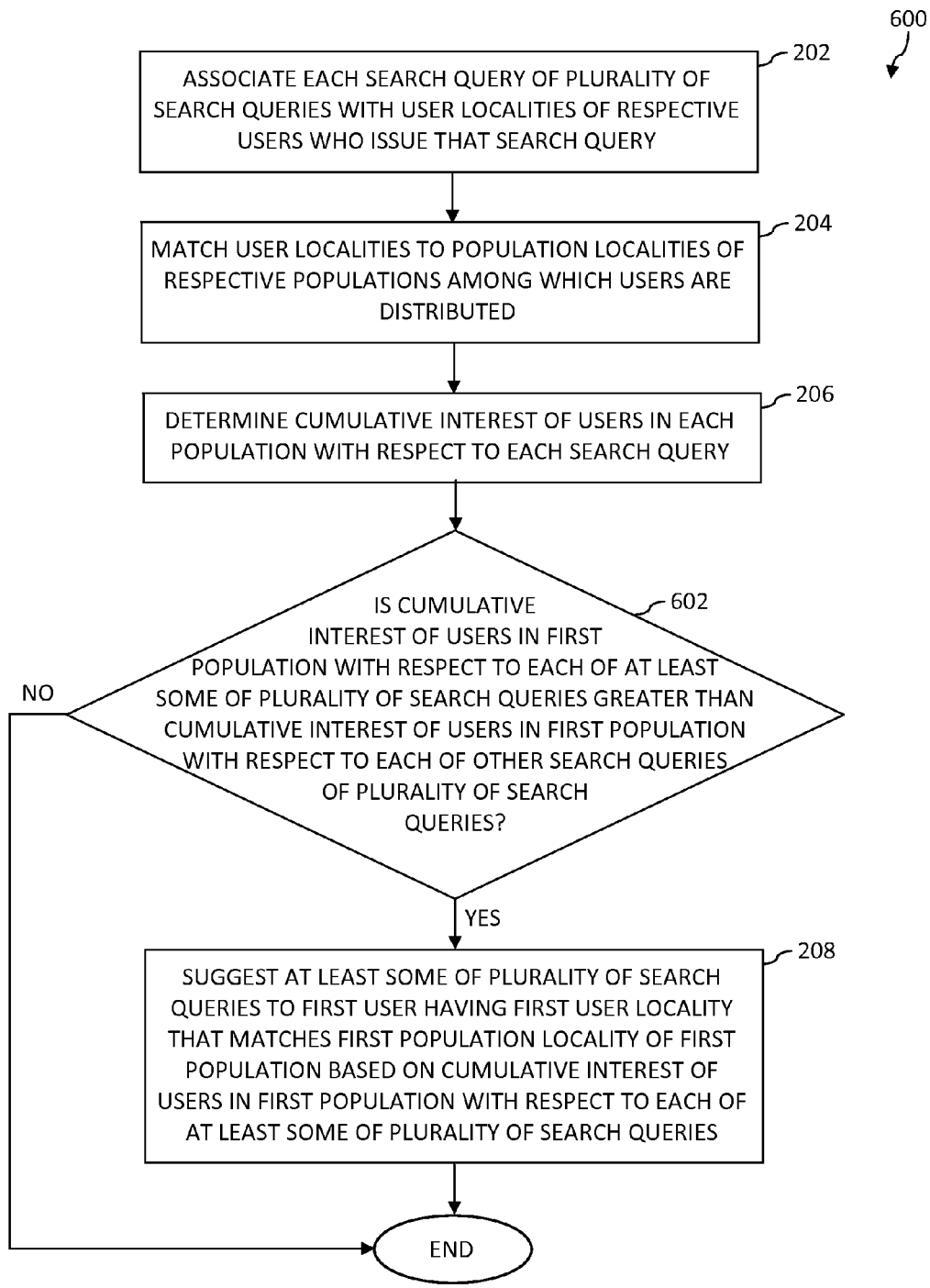

FIGS. 5 and 6 depict respective flowcharts 500 and 600 of methods for providing locality-sensitive search suggestions in accordance with embodiments described herein. Flowcharts 500 and 600 may be performed by any one or more of Web servers 106A-106N of computer system 100 shown in FIG. 1, for example. For illustrative purposes, flowcharts 500 and 600 are described with respect to a Web server 106" shown in FIG. 7, which is an example of a Web server 106, according to an embodiment.

Figure 7:
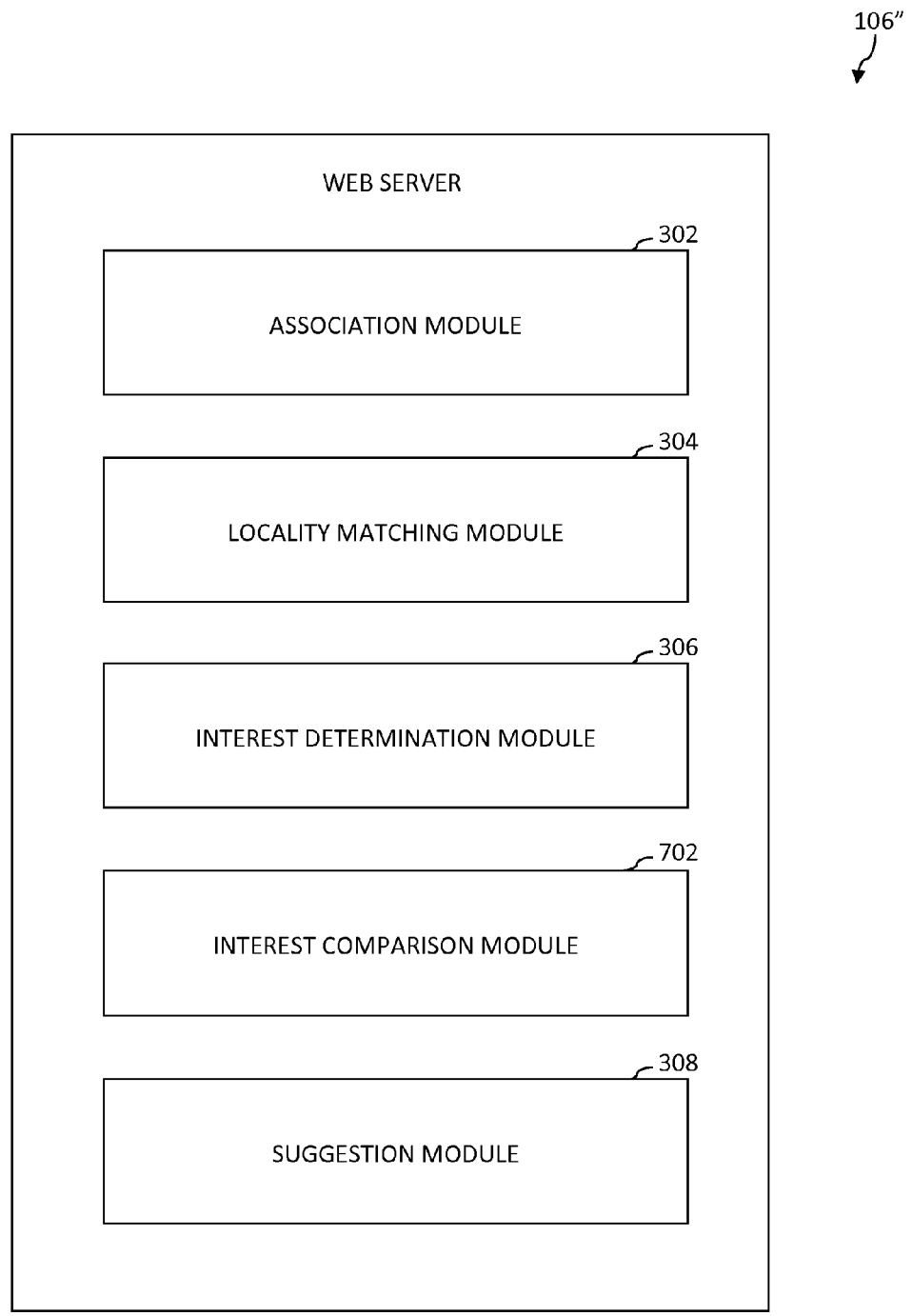

As shown in FIG. 7, Web server 106" includes an association module 302, a locality matching module 304, an interest determination module 306, an interest comparison module 702, and a suggestion module 308. Further structural and operational embodiments will be apparent to persons skilled in the relevant art(s) based on the discussion regarding flowcharts 500 and 600. Flowcharts 500 and 600 are described as follows.

As shown in FIG. 5, the method of flowchart 500 begins at step 202. In step 202, each search query of a plurality of search queries is associated with user localities of respective users who issue that search query. In an example implementation, association module 302 associates each search query with the user localities of the respective users who issue that search query.

At step 204, the user localities are matched to population localities of respective populations among which the users are distributed. In an example implementation, locality matching module 304 matches the user localities to the population localities.

At step 206, cumulative interest of the users in each population is determined with respect to each search query. In an example implementation, interest determination module 306 determines the cumulative interest of the users in each population.

At step 502, a determination is made whether the cumulative interest of the users in a first population with respect to each of at least some of the plurality of search queries is greater than the cumulative interests of the users in other respective populations of the plurality of populations with respect to each of the at least some of the plurality of search queries. In an example implementation, interest comparison module 702 determines whether the cumulative interest of the users in the first population is greater than the cumulative interests of the users in other respective populations. If the cumulative interest of the users in the first population is greater than the cumulative interests of the users in other respective populations, flow continues to step 208. Otherwise, flowchart 500 ends.

At step 208, the at least some of the plurality of search queries are suggested to the first user having a first user locality that matches a first population locality of the first population based on the cumulative interest of the users in the first population with respect to each of the at least some of the plurality of search queries. In an example implementation, suggestion module 308 suggests at least some of the plurality of search queries to the first user. Flowchart 500 ends upon completion of step 208.

As shown in FIG. 6, flowchart 600 is the same as flowchart 500 of FIG. 5, except step 502 is replaced with step 602. At step 602, a determination is made whether the cumulative interest of the users in a first population with respect to each of at least some of the plurality of search queries is greater than the cumulative interest of the users in a first population with respect to each of the other search queries of the plurality of search queries. In an example implementation, interest comparison module 702 determines whether the cumulative interest of the users in the first population with respect to each of the at least some of the plurality of search queries is greater than the cumulative interest of the users in the first population with respect to each of the other search queries of the plurality of search queries. If the cumulative interest of the users in the first population with respect to each of the at least some of the plurality of search queries is greater than the cumulative interest of the users in the first population with respect to each of the other search queries of the plurality of search queries, flow continues to step 208, which is described above. Otherwise, flowchart 600 ends.

Figure 8:
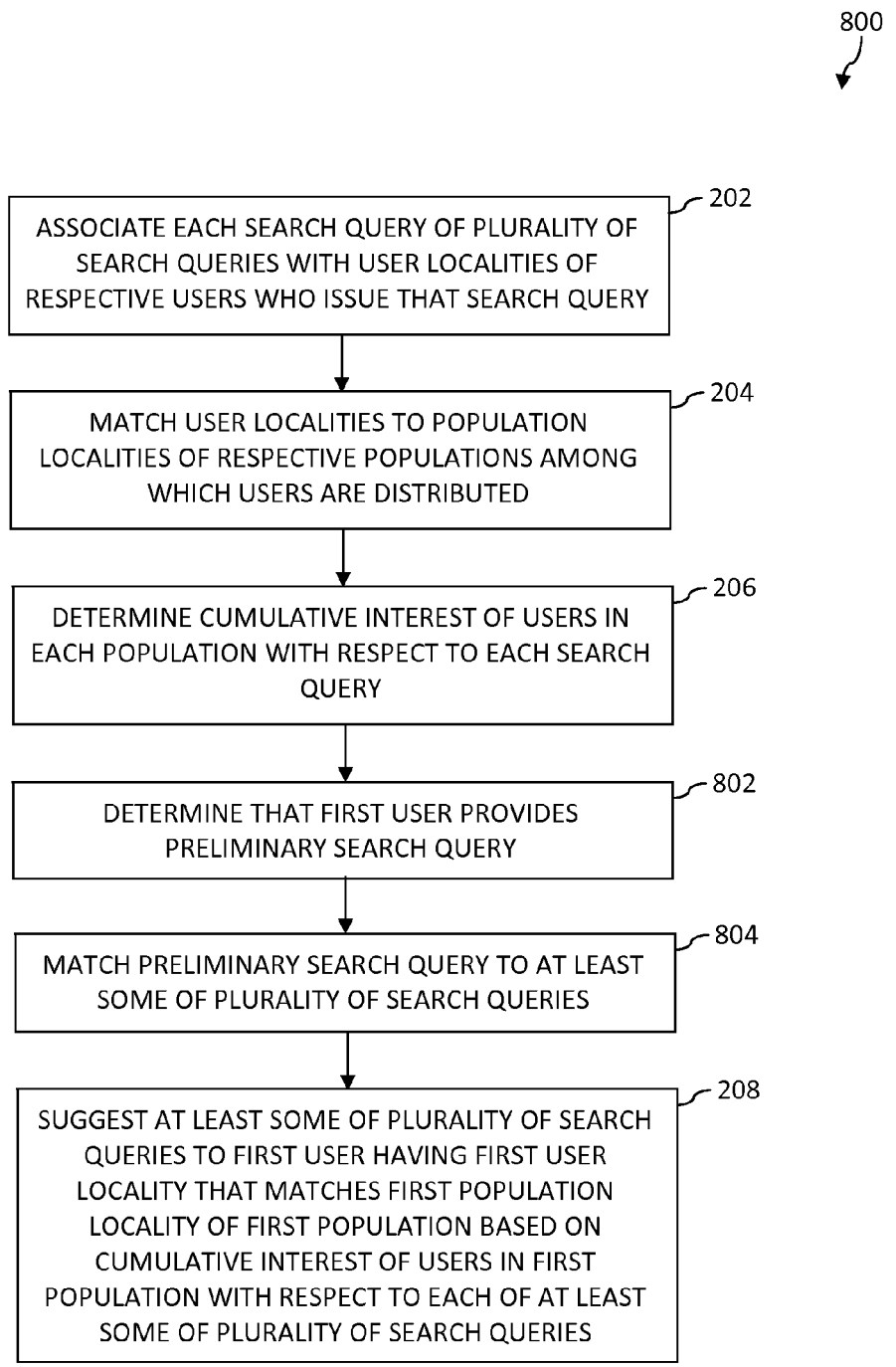

FIG. 8 depicts a flowchart 800 of a method for providing locality-sensitive search suggestions in accordance with an embodiment described herein. Flowchart 800 may be performed by any one or more of Web servers 106A-106N of computer system 100 shown in FIG. 1, for example. For illustrative purposes, flowchart 800 is described with respect to a Web server 106''' shown in FIG. 9, which is an example of a Web server 106, according to an embodiment.

Figure 9:
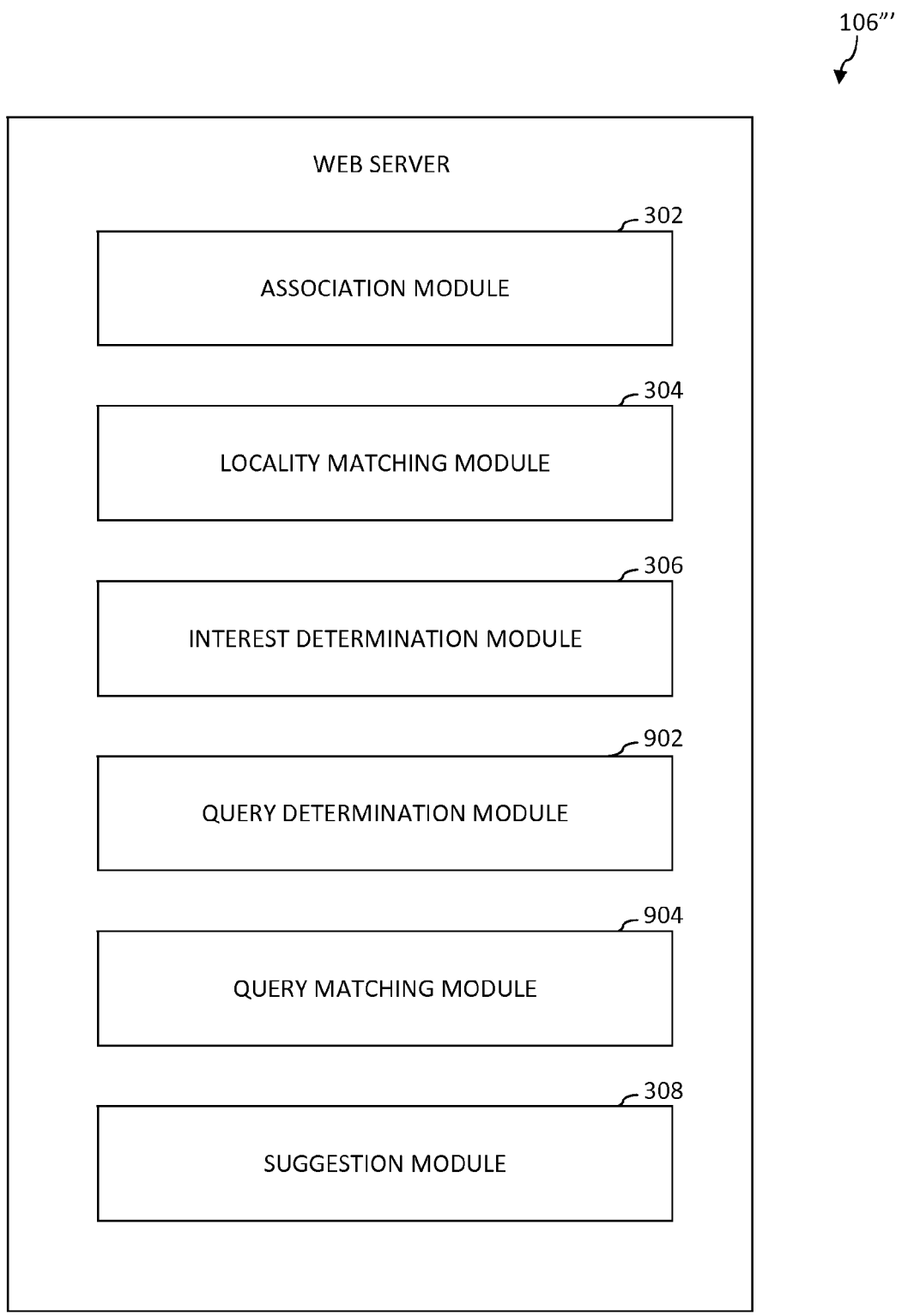

As shown in FIG. 9, Web server 106''' includes an association module 302, a locality matching module 304, an interest determination module 306, a query determination module 902, a query matching module 904, and a suggestion module 308. Further structural and operational embodiments will be apparent to persons skilled in the relevant art(s) based on the discussion regarding flowchart 800. Flowchart 800 is described as follows.

As shown in FIG. 8, the method of flowchart 800 begins at step 202. In step 202, each search query of a plurality of search queries is associated with user localities of respective users who issue that search query. In an example implementation, association module 302 associates each search query with the user localities of the respective users who issue that search query.

At step 204, the user localities are matched to population localities of respective populations among which the users are distributed. In an example implementation, locality matching module 304 matches the user localities to the population localities.

At step 206, cumulative interest of the users in each population is determined with respect to each search query. In an example implementation, interest determination module 306 determines the cumulative interest of the users in each population.

At step 802, a determination is made that a first user provides a preliminary search query. In an example implementation, query determination module 902 determines that the first user provides the preliminary search query.

At step 804, the preliminary search query is matched to at least some of the plurality of search queries. In an example implementation, query matching module 904 matches the preliminary search query to the at least some of the plurality of search queries. For instance, query matching module 904 may perform a statistical analysis, a keyword analysis, any other suitable analysis, or a combination thereof to match the preliminary search query to the at least some of the plurality of search queries.

At step 208, the at least some of the plurality of search queries are suggested to the first user having a first user locality that matches a first population locality of a first population based on the cumulative interest of the users in the first population with respect to each of the at least some of the plurality of search queries. In an example implementation, suggestion module 308 suggests at least some of the plurality of search queries to the first user.

Figure 10:
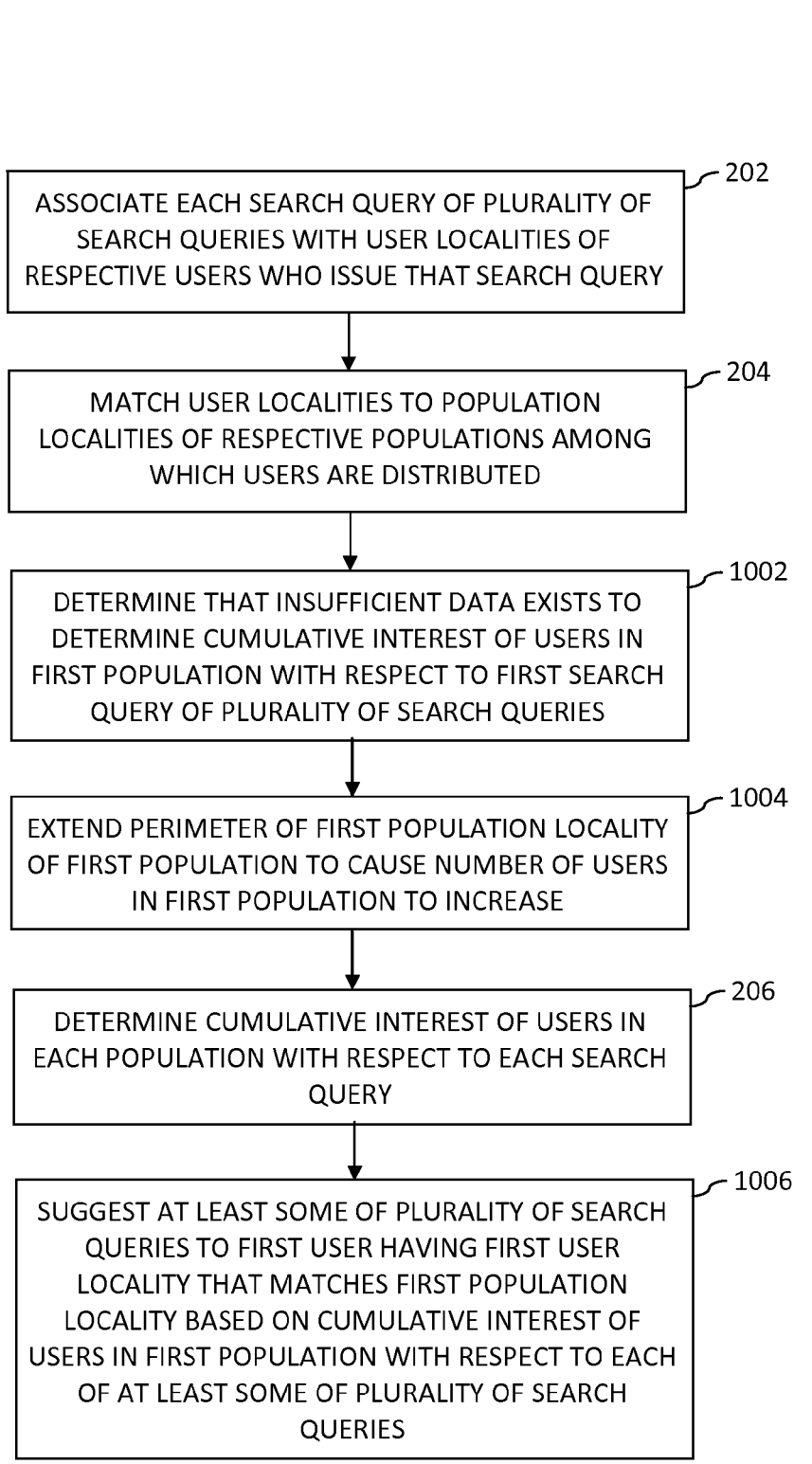

FIG. 10 depicts a flowchart 1000 of a method for providing locality-sensitive search suggestions in accordance with an embodiment described herein. Flowchart 1000 may be performed by any one or more of Web servers 106A-106N of computer system 100 shown in FIG. 1, for example. For illustrative purposes, flowchart 1000 is described with respect to a Web server 106''' shown in FIG. 11, which is an example of a Web server 106, according to an embodiment.

Figure 11:
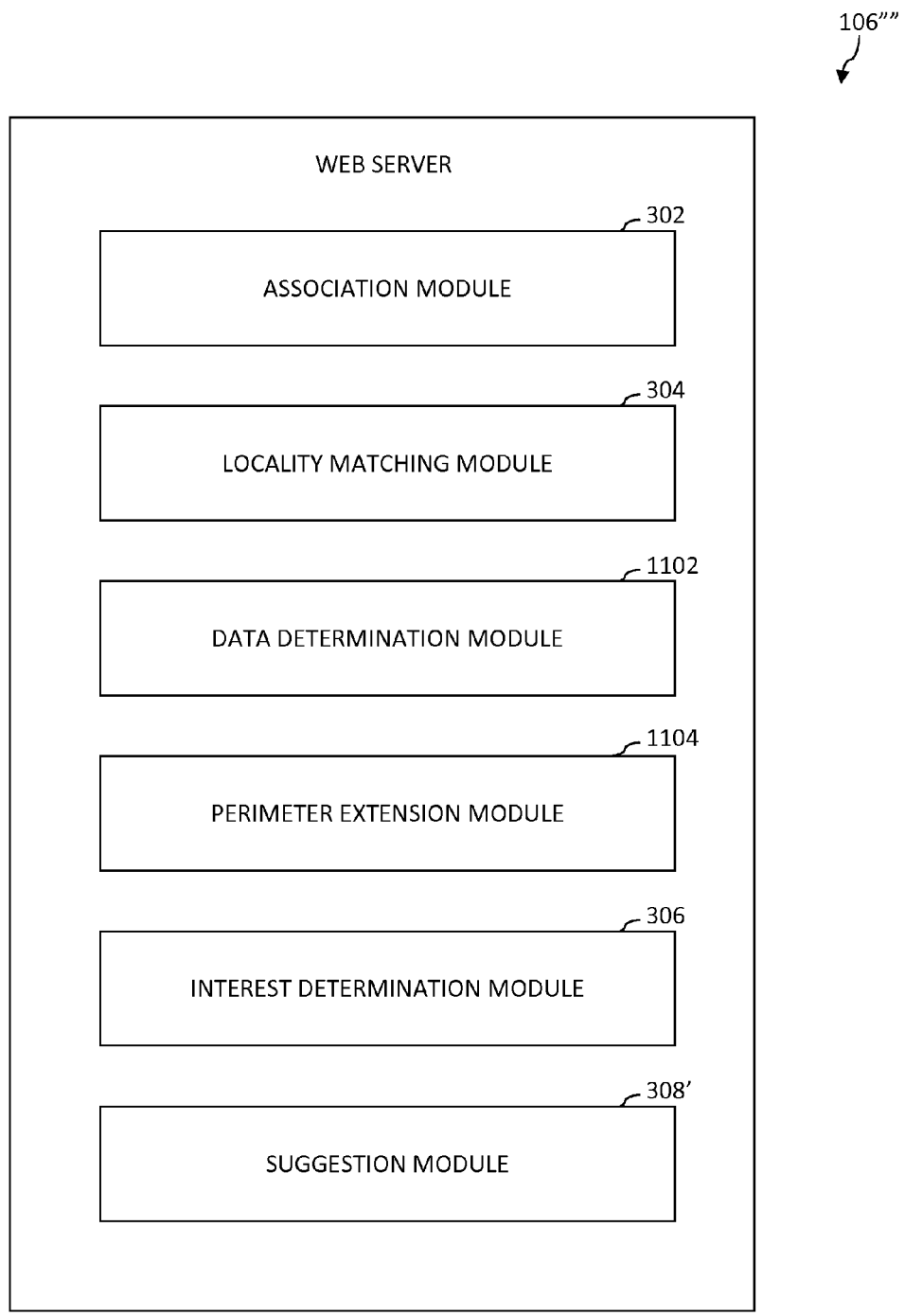

As shown in FIG. 11, Web server 106''' includes an association module 302, a locality matching module 304, a data determination module 1102, a perimeter extension module 1104, an interest determination module 306, and a suggestion module 308'. Further structural and operational embodiments will be apparent to persons skilled in the relevant art(s) based on the discussion regarding flowchart 1000. Flowchart 1000 is described as follows.

As shown in FIG. 10, the method of flowchart 1000 begins at step 202. In step 202, each search query of a plurality of search queries is associated with user localities of respective users who issue that search query. In an example implementation, association module 302 associates each search query with the user localities of the respective users who issue that search query.

At step 204, the user localities are matched to population localities of respective populations among which the users are distributed. In an example implementation, locality matching module 304 matches the user localities to the population localities.

At step 1002, a determination is made that insufficient data exists to determine a cumulative interest of the users in a first population with respect to a first search query of a plurality of search queries. For example, it is possible that none of the users in the first population has issued the first search query. In an example implementation, data determination module 1102 determines that insufficient data exists to determine the cumulative interest of the users in the first population.

At step 1004, a perimeter of a first population locality of the first population is extended to cause a number of the users in the first population to increase. In an example implementation, perimeter extension module 1104 extends the perimeter of the first population locality. For example, perimeter extension module 1104 may change the first population locality from a geographic area corresponding to a zip code to a city, from a city to a county, from a county to a state, etc. In another example, perimeter extension module 1104 may extend the perimeter of the first population locality a designated distance beyond the initial perimeter of the first population locality. For instance, if the first population locality is designated as Seattle, Wash., perimeter extension module 1104 may extend the perimeter of the first locality to include the geographic area 100 miles beyond the perimeter of Seattle, Wash. In yet another example, the first population locality may be defined as one or more disjoint geographic regions. In accordance with this example, perimeter extension module 1104 may extend the perimeter of the first population locality by expanding the first population locality to include other disjoint geographic regions.

At step 206, the cumulative interest of the users in each population is determined with respect to each search query. In an example implementation, interest determination module 306 determines the cumulative interest of the users in each population.

At step 1006, at least some of the plurality of search queries are suggested to a first user having a first user locality that matches the first population locality based on the cumulative interest of the users in the first population with respect to each of the at least some of the plurality of search queries. In an example implementation, suggestion module 308' suggests at least some of the plurality of search queries to the first user.

Figure 12:
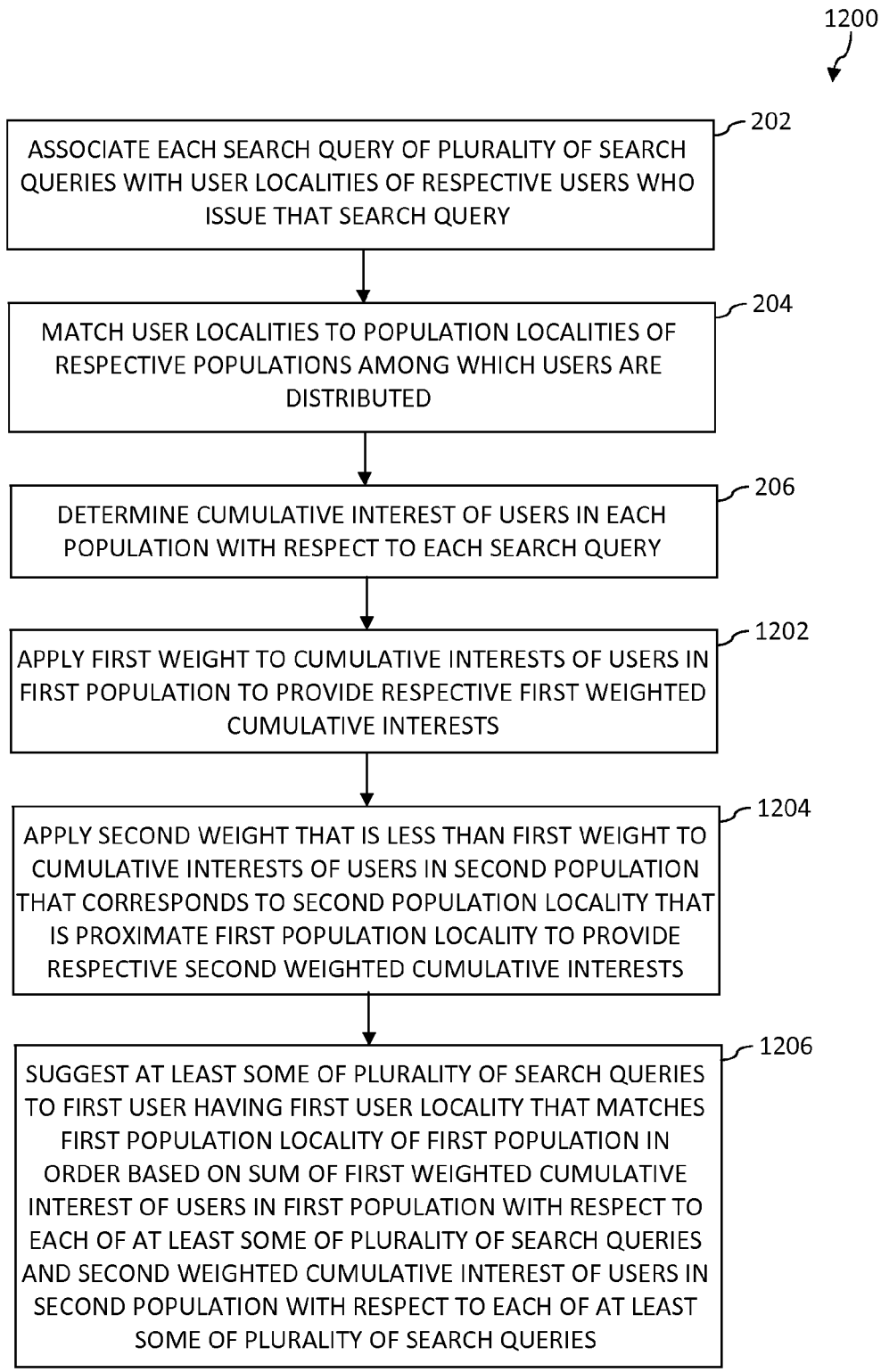

FIG. 12 depicts a flowchart 1200 of a method for providing locality-sensitive search suggestions in accordance with an embodiment described herein. Flowchart 1200 may be performed by any one or more of Web servers 106A-106N of computer system 100 shown in FIG. 1, for example. For illustrative purposes, flowchart 1200 is described with respect to a Web server 106'''' shown in FIG. 13, which is an example of a Web server 106, according to an embodiment.

Figure 13:
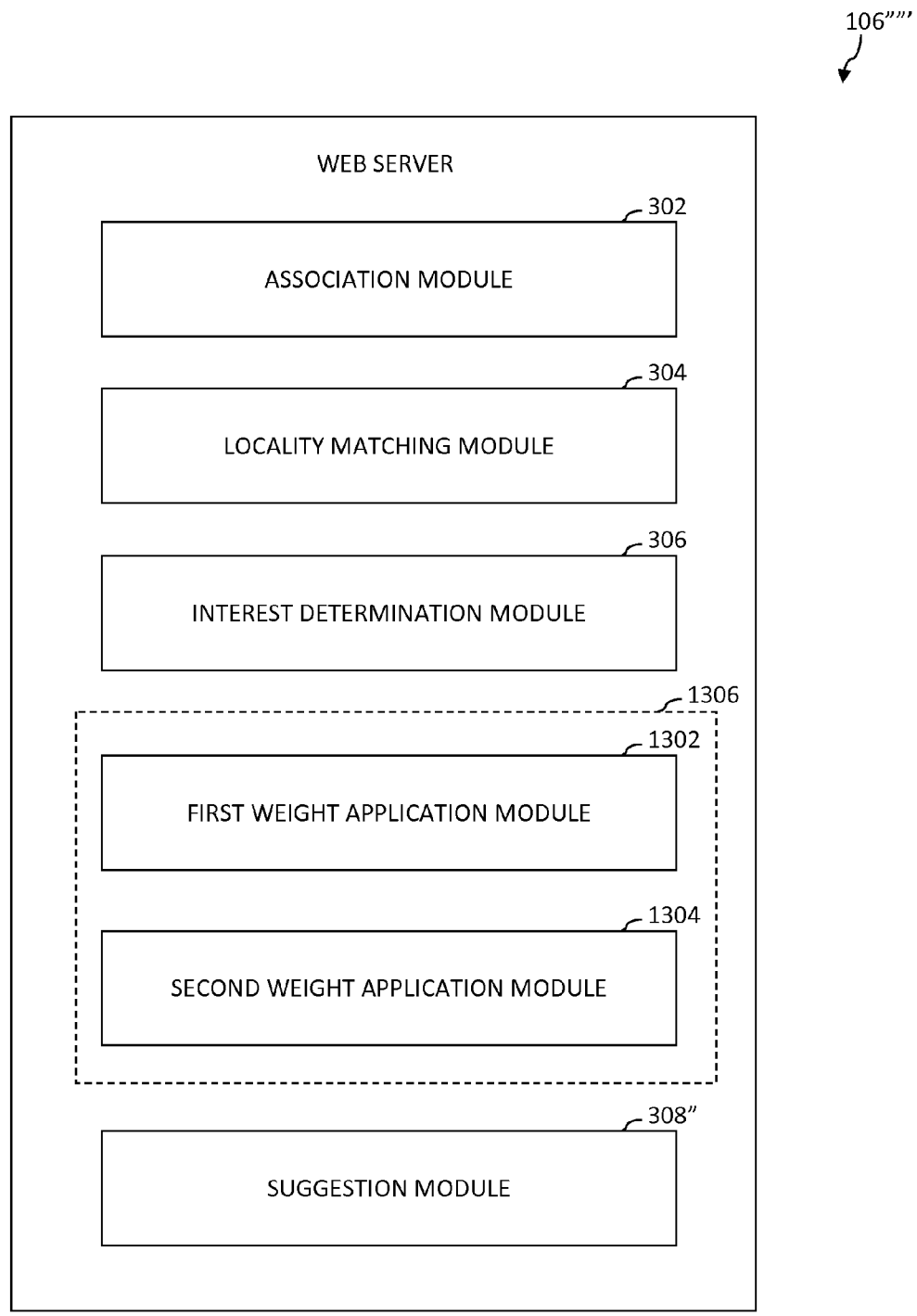

As shown in FIG. 13, Web server 106'''' includes an association module 302, a locality matching module 304, an interest determination module 306, a first weight application module 1302, a second weight application module 1304, and a suggestion module 308". First weight application module 1302 and second weight application module 1304 may be combined into a common weight application module 1306, though the scope of the example embodiments is not limited in this respect. Further structural and operational embodiments will be apparent to persons skilled in the relevant art(s) based on the discussion regarding flowchart 1200. Flowchart 1200 is described as follows.

As shown in FIG. 12, the method of flowchart 1200 begins at step 202. In step 202, each search query of a plurality of search queries is associated with user localities of respective users who issue that search query. In an example implementation, association module 302 associates each search query with the user localities of the respective users who issue that search query.

At step 204, the user localities are matched to population localities of respective populations among which the users are distributed. In an example implementation, locality matching module 304 matches the user localities to the population localities.

At step 206, cumulative interest of the users in each population is determined with respect to each search query. In an example implementation, interest determination module 306 determines the cumulative interest of the users in each population.

At step 1202, a first weight is applied to the cumulative interest of the users in a first population to provide respective first weighted cumulative interests. In an example implementation, first weight application module 1302 may apply the first weight to the cumulative interest of the users in the first population.

At step 1204, a second weight that is less than the first weight is applied to the cumulative interests of the users in a second population that corresponds to a second population locality that is proximate the first population locality to provide respective second weighted cumulative interests. In an example implementation, second weight application module 1304 may apply the second weight to the cumulative interest of the users in the second population.

At step 1206, at least some of the plurality of search queries are suggested to a first user having a first user locality that matches a first population locality of the first population in an order that is based on a sum of the first weighted cumulative interest of the users in the first population with respect to each of the at least some of the plurality of search queries and the second weighted cumulative interest of the users in the second population with respect to each of the at least some of the plurality of search queries. In an example implementation, suggestion module 308'' suggests at least some of the plurality of search queries to the first user.

Figure 14:
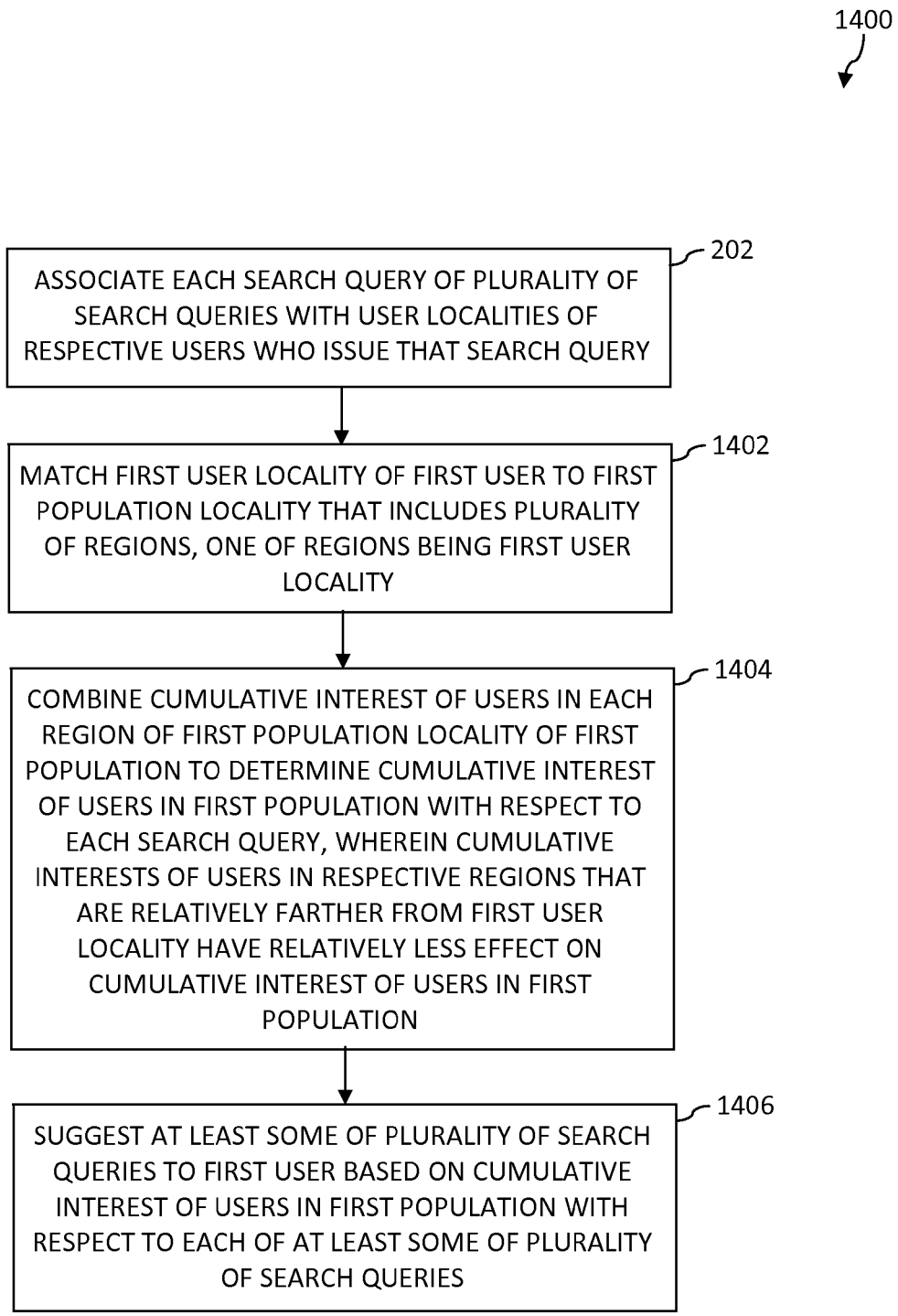

FIG. 14 depicts a flowchart 1400 of a method for providing locality-sensitive search suggestions in accordance with an embodiment described herein. Flowchart 1400 may be performed by any one or more of Web servers 106A-106N of computer system 100 shown in FIG. 1, for example. For illustrative purposes, flowchart 1400 is described with respect to a Web server 106'''' shown in FIG. 15, which is an example of a Web server 106, according to an embodiment.

Figure 15:
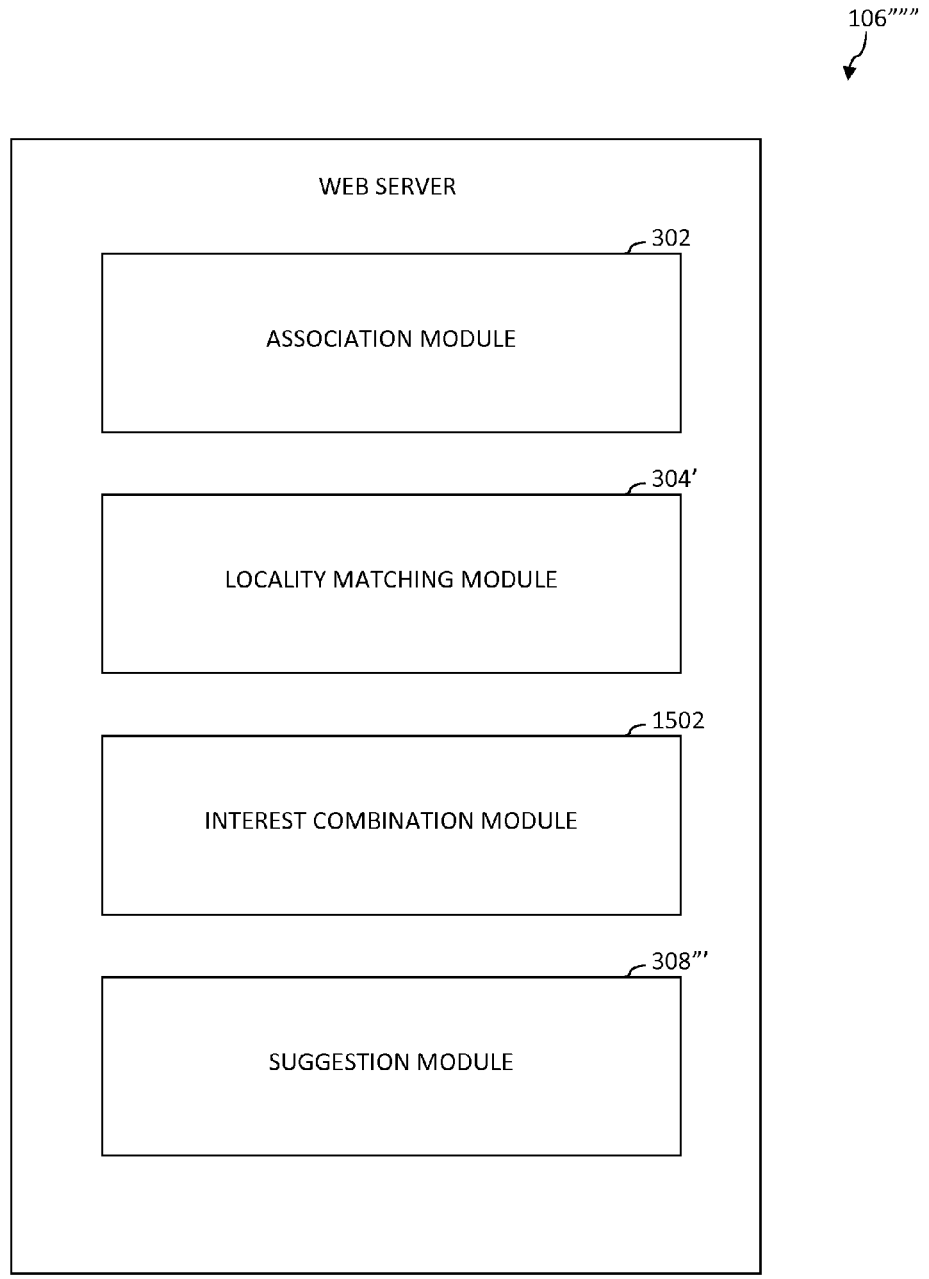

As shown in FIG. 15, Web server 106'''' includes an association module 302, a locality matching module 304', an interest combination module 1502, and a suggestion module 308'''. Further structural and operational embodiments will be apparent to persons skilled in the relevant art(s) based on the discussion regarding flowchart 1400. Flowchart 1400 is described as follows.

As shown in FIG. 14, the method of flowchart 1400 begins at step 202. In step 202, each search query of a plurality of search queries is associated with user localities of respective users who issue that search query. In an example implementation, association module 302 associates each search query with the user localities of the respective users who issue that search query.

At step 1402, a first user locality of a first user is matched to a first population locality that includes a plurality of regions, one of the regions being the first user locality. In an example implementation, locality matching module 304' matches the first user locality to the first population locality.

At step 1404, cumulative interest of the users in each region of the first population locality of the first population are combined to determine cumulative interest of the users in the first population with respect to each search query. The cumulative interests of the users in respective regions that are relatively farther from the first user locality have relatively less effect on the cumulative interest of the users in the first population. "Relatively farther" may be defined in terms of a geographic distance and/or a cultural difference. In an example implementation, interest combination module 1502 combines the cumulative interest of the users in each region of the first population locality of the first population.

At step 1406, at least some of the plurality of search queries are suggested to the first user based on the cumulative interest of the users in the first population with respect to each of the at least some of the plurality of search queries. In an example implementation, suggestion module 308''' suggests at least some of the plurality of search queries to the first user.

Figure 16:
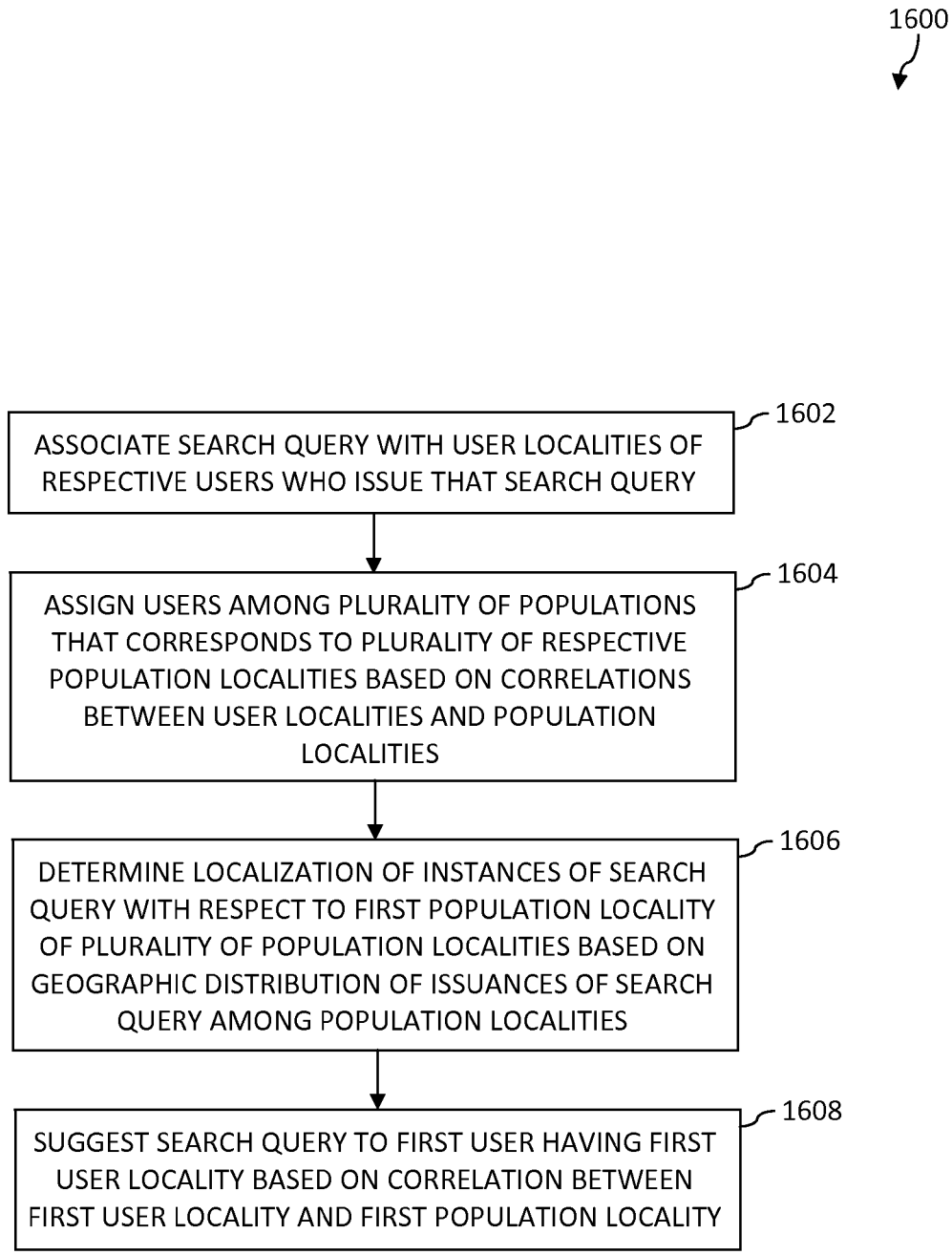

FIG. 16 depicts a flowchart 1600 of a method for providing locality-sensitive search suggestions in accordance with an embodiment described herein. Flowchart 1600 may be performed by any one or more of Web servers 106A-106N of computer system 100 shown in FIG. 1, for example. For illustrative purposes, flowchart 1600 is described with respect to a Web server 106''''' shown in FIG. 17, which is an example of a Web server 106, according to an embodiment.

Figure 17:
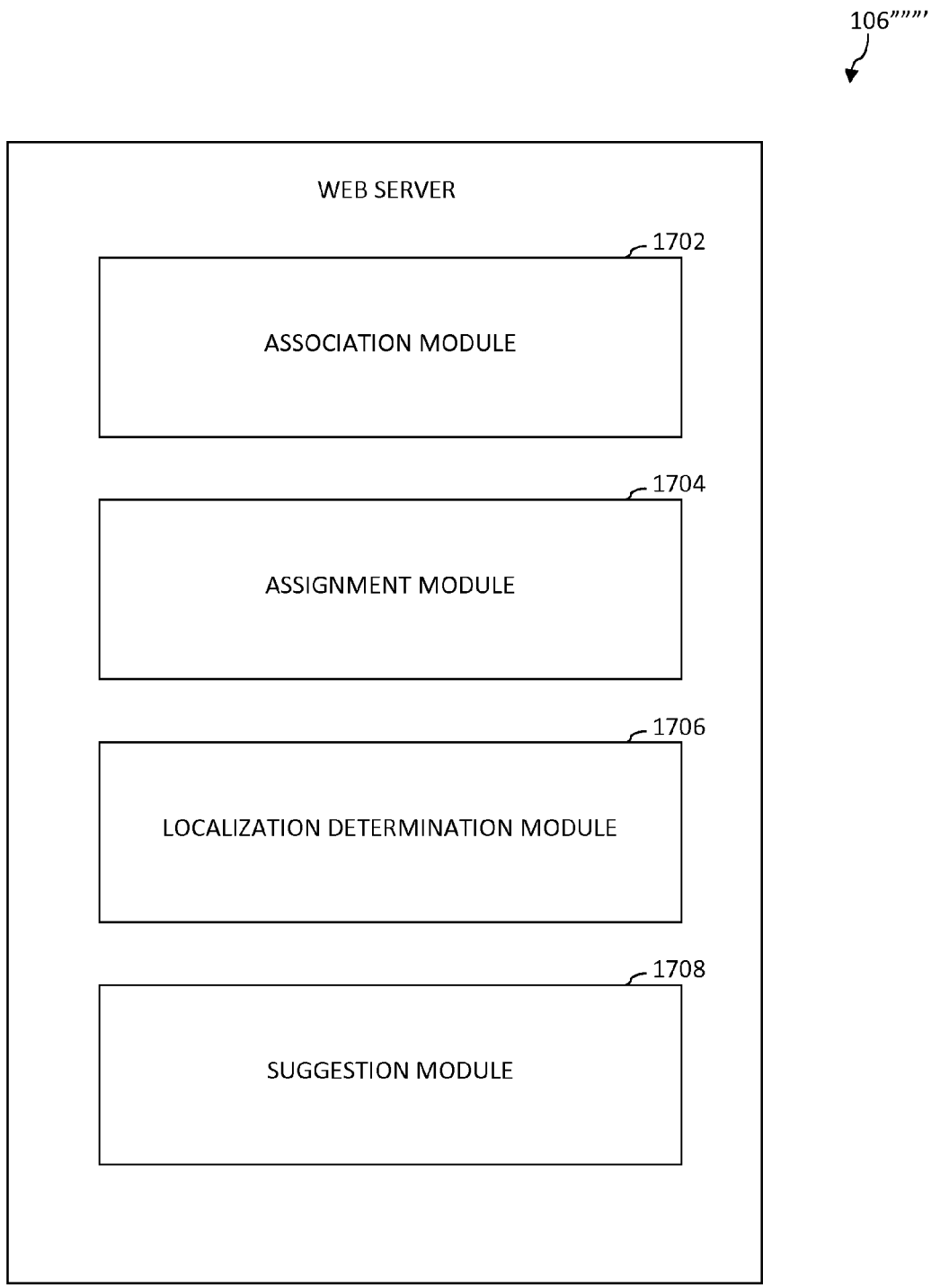

As shown in FIG. 17, Web server 106''''' includes an association module 1702, an assignment module 1704, a localization determination module 1706, and a suggestion module 1708. Further structural and operational embodiments will be apparent to persons skilled in the relevant art(s) based on the discussion regarding flowchart 1600. Flowchart 1600 is described as follows.

As shown in FIG. 16, the method of flowchart 1600 begins at step 1602. In step 1602, a search query is associated with user localities of respective users who issue that search query. In an example implementation, association module 1702 associates the search query with the user localities.

At step 1604, the users are assigned among a plurality of populations that corresponds to a plurality of respective population localities based on correlations between the user localities and the population localities. For instance, the users may be assigned among the plurality of populations based on the user localities of the respective users being included in the population localities that correspond to the respective populations. In an example implementation, assignment module 1704 assigns the users among the plurality of populations.

At step 1606, a localization of instances of the search query with respect to a first population locality of the plurality of population localities is determined based on a geographic distribution of the issuances of the search query among the population localities. For example, the localization of the instances of the search query may be based on a number of instances of the search query that are issued by the users in the first population, the frequency with which the users in the first population issue the search query, the probability that the search query will be issued by users in the first population (e.g., with respect to other search queries and/or other populations), etc. In an example implementation, localization determination module 1706 determines the localization of the instances of the search query.

At step 1608, the search query is suggested to a first user having a first user locality based on the correlation between the first user locality and the first population locality. In an example implementation, suggestion module 1708 suggests the search query to the first user.

Figure 18:
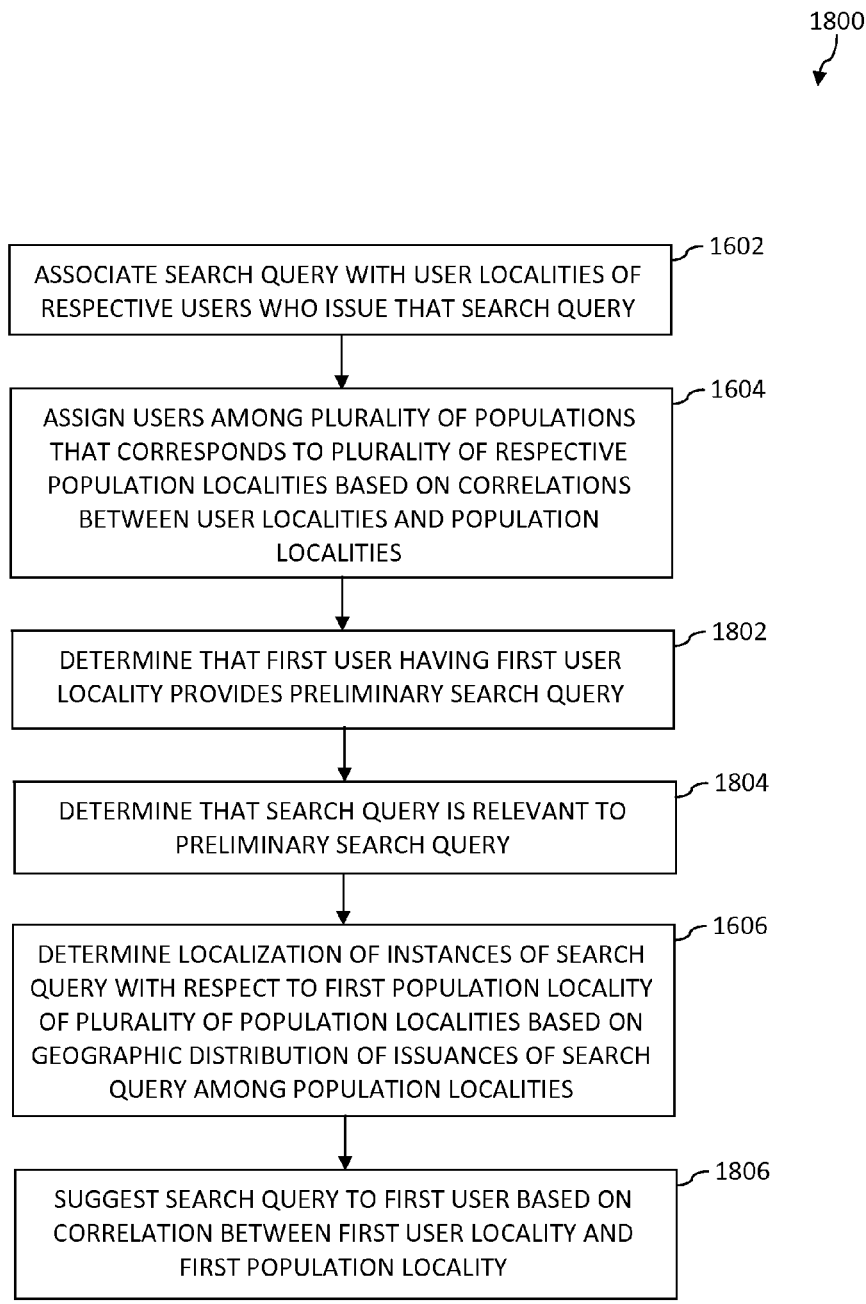

FIG. 18 depicts a flowchart 1800 of a method for providing locality-sensitive search suggestions in accordance with an embodiment described herein. Flowchart 1800 may be performed by any one or more of Web servers 106A-106N of computer system 100 shown in FIG. 1, for example. For illustrative purposes, flowchart 1800 is described with respect to a Web server 106'''''' shown in FIG. 19, which is an example of a Web server 106, according to an embodiment.

Figure 19:
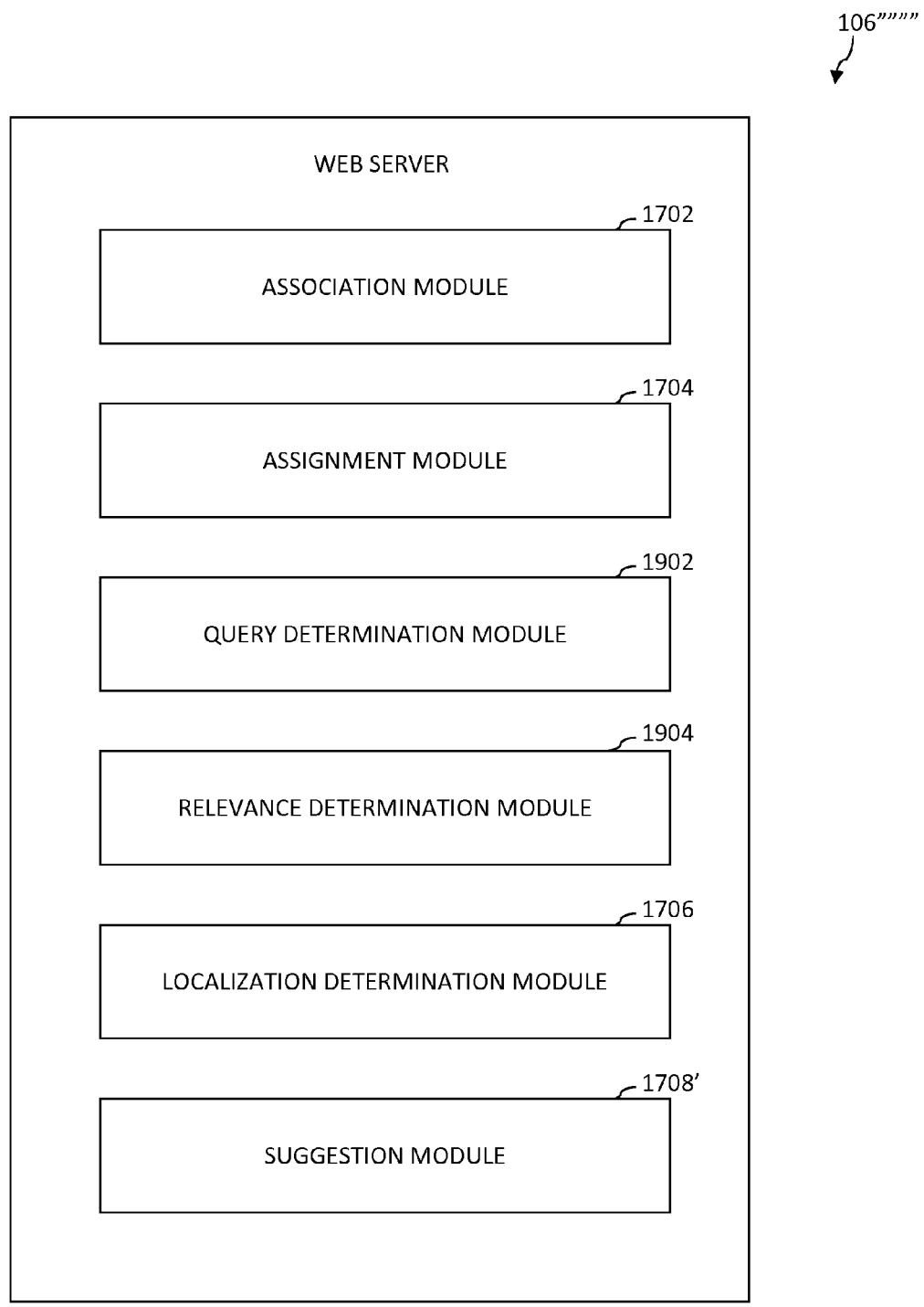

As shown in FIG. 19, Web server 106'''''' includes an association module 1702, an assignment module 1704, a query determination module 1902, a relevance determination module 1904, a localization determination module 1706, and a suggestion module 1708'. Further structural and operational embodiments will be apparent to persons skilled in the relevant art(s) based on the discussion regarding flowchart 1800. Flowchart 1800 is described as follows.

As shown in FIG. 18, the method of flowchart 1800 begins at step 1602. In step 1602, a search query is associated with user localities of respective users who issue that search query. In an example implementation, association module 1702 associates the search query with the user localities.

At step 1604, the users are assigned among a plurality of populations that corresponds to a plurality of respective population localities based on correlations between the user localities and the population localities. In an example implementation, assignment module 1704 assigns the users among the plurality of populations.

At step 1802, a determination is made that a first user having a first user locality provides a preliminary search query. In an example implementation, query determination module 1902 determines that the first user provides the preliminary search query.

At step 1804, a determination is made that the search query is relevant to the preliminary search query. In an example implementation, relevance determination module 1904 determines that the search query is relevant to the preliminary search query.

At step 1606, a localization of instances of the search query with respect to a first population locality of the plurality of population localities is determined based on a geographic distribution of the issuances of the search query among the population localities. In an example implementation, localization determination module 1706 determines the localization of the instances of the search query.

At step 1806, the search query is suggested to the first user based on the correlation between the first user locality and the first population locality. In an example implementation, suggestion module 1708' suggests the search query to the first user.

Figure 20:
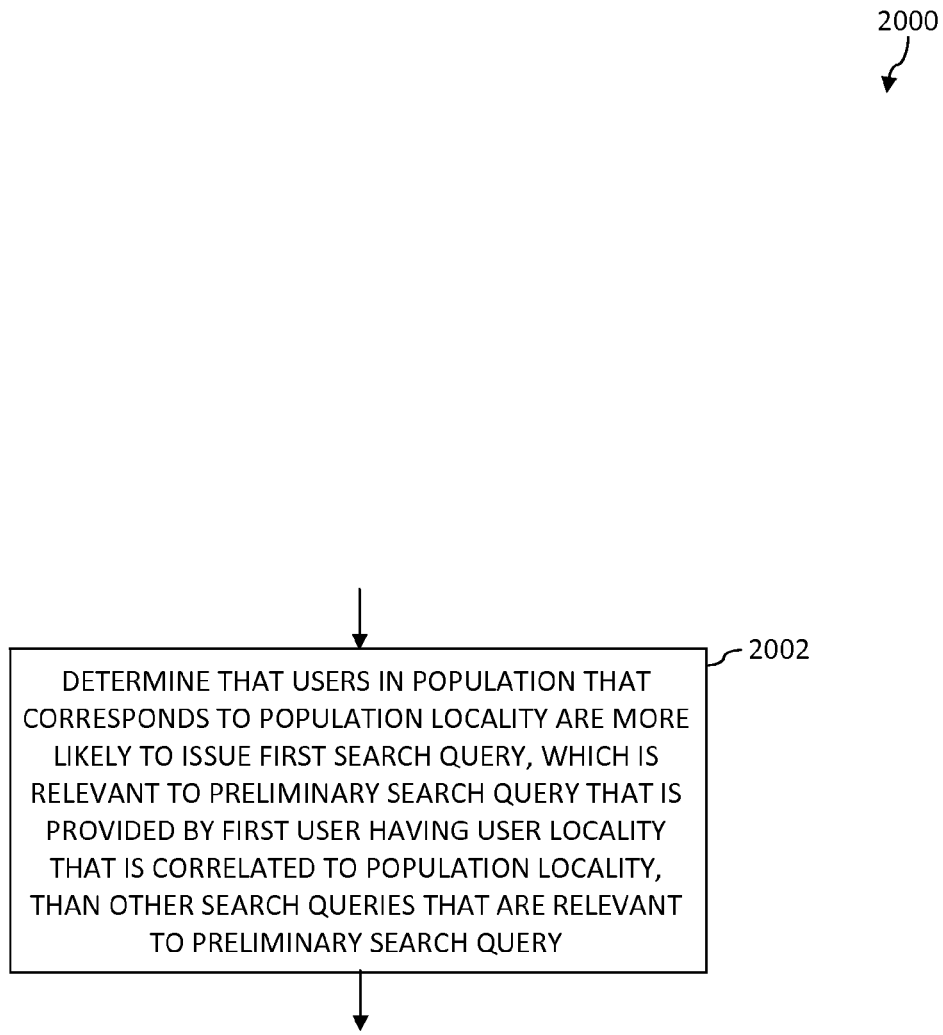
FIG. 20 depicts a flowchart of a method for determining localization of instances of a first search query with respect to a population locality in accordance with an embodiment described herein.

FIG. 20 depicts a flowchart 2000 of a method for determining localization of instances of a first search query with respect to a population locality in accordance with an embodiment described herein. As shown in FIG. 20, the method of flowchart 2000 includes step 2002. At step 2002, a determination is made that users in a population that corresponds to the population locality are more likely to issue the first search query, which is relevant to a preliminary search query that is provided by a first user having a user locality that is correlated to the population locality, than other search queries that are relevant to the preliminary search query. In an example implementation, localization determination module 1706, as shown in FIG. 19 for example, determines that the users in the population that corresponds to the population locality are more likely to issue the first search query than other search queries that are relevant to the preliminary search query. It should be noted that the method of flowchart 2000 is provided to show one example method for determining localization of instances of a search query and is not intended to be limiting. Persons skilled in the relevant art(s) will recognize that other methods for determining localization of instances of a search query are within the scope of the example embodiments.

Figure 21:
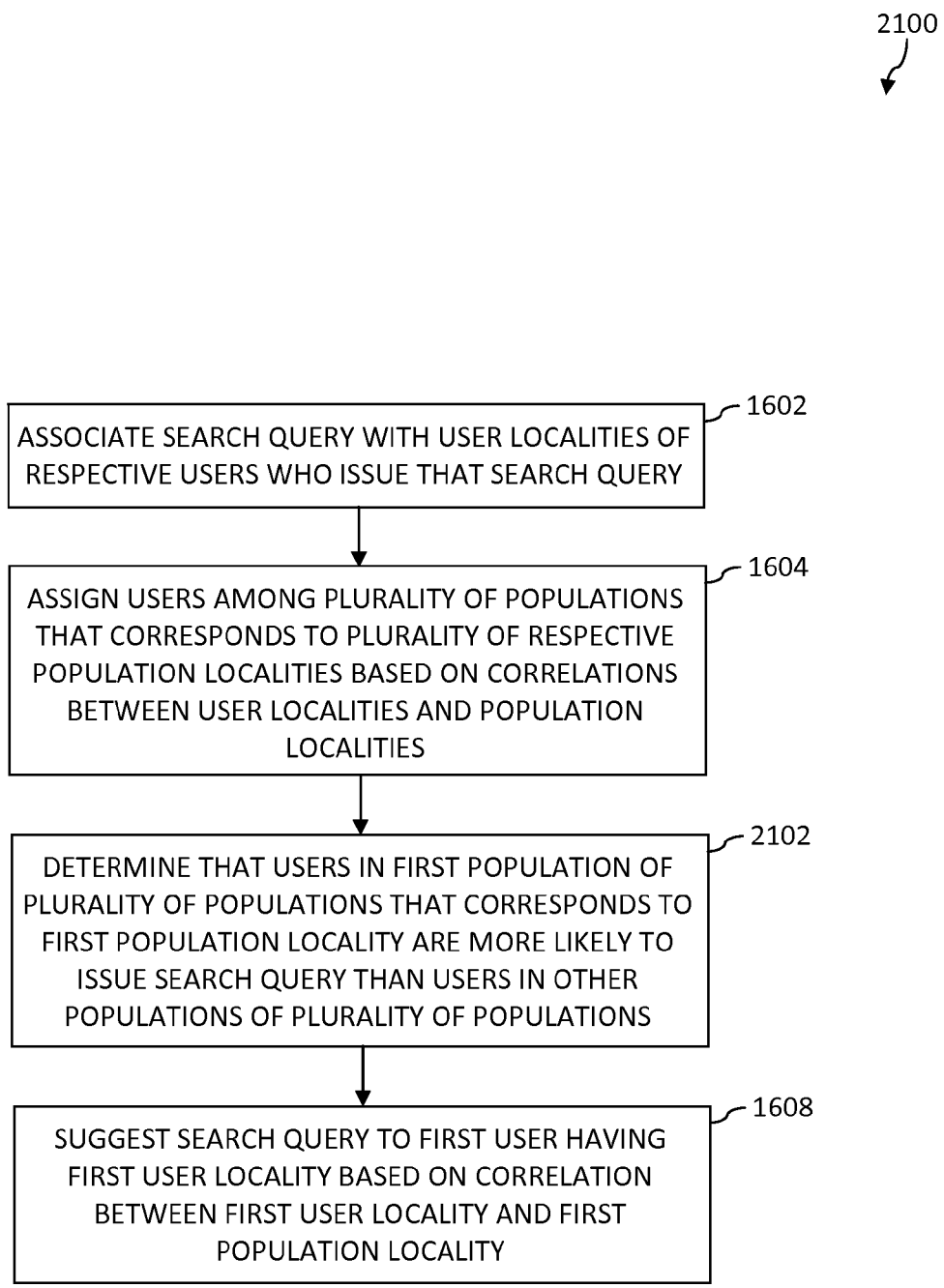

FIG. 21 depicts a flowchart 2100 of a method for providing locality-sensitive search suggestions in accordance with an embodiment described herein. Flowchart 2100 may be performed by any one or more of Web servers 106A-106N of computer system 100 shown in FIG. 1, for example. For illustrative purposes, flowchart 2100 is described with respect to a Web server 106'''''' shown in FIG. 22, which is an example of a Web server 106, according to an embodiment.

Figure 22:
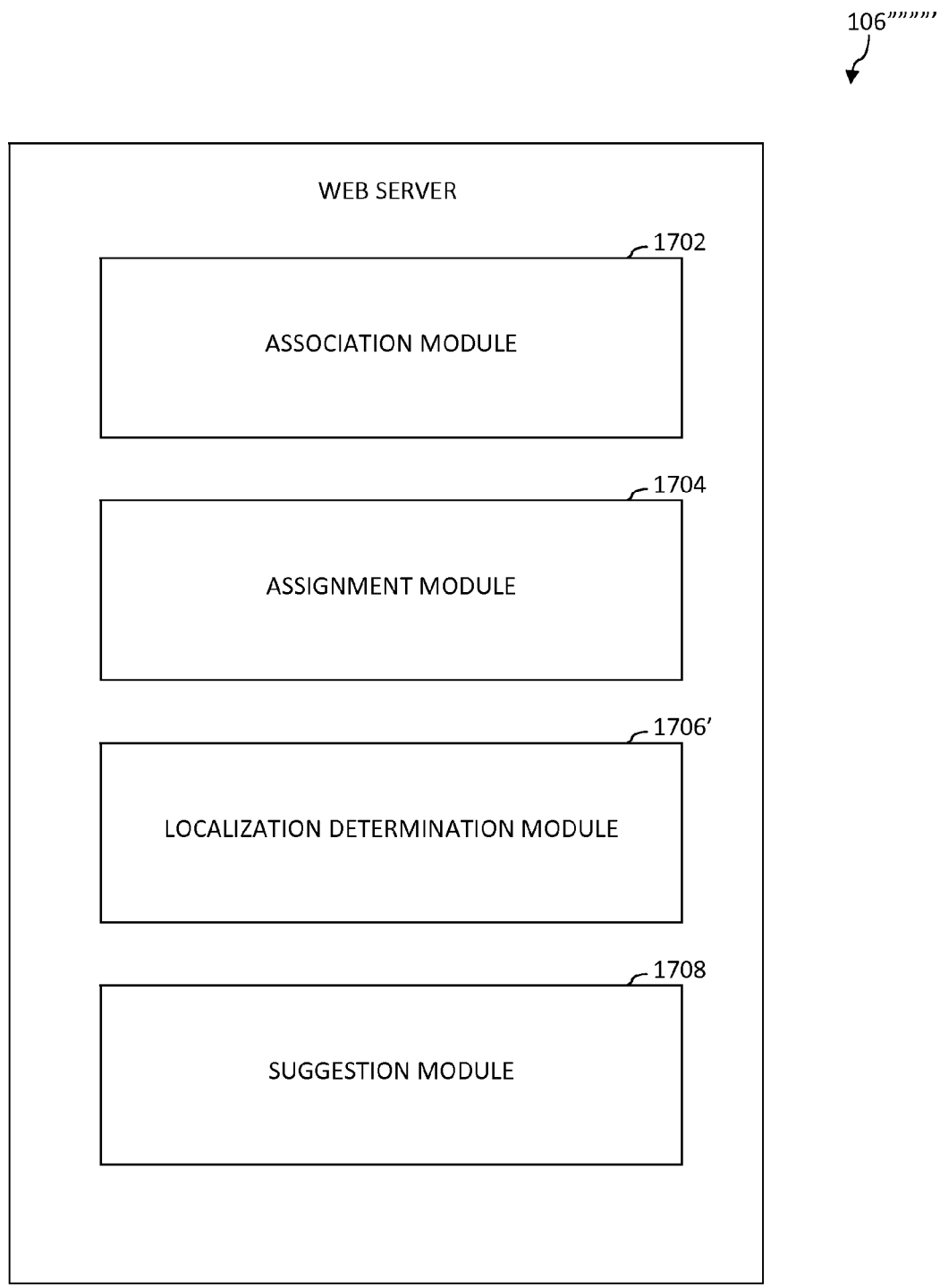

As shown in FIG. 22, Web server 106'''''' includes an association module 1702, an assignment module 1704, a localization determination module 1706', and a suggestion module 1708. Further structural and operational embodiments will be apparent to persons skilled in the relevant art(s) based on the discussion regarding flowchart 2100. Flowchart 2100 is described as follows.

As shown in FIG. 21, the method of flowchart 2100 begins at step 1602. In step 1602, a search query is associated with user localities of respective users who issue that search query. In an example implementation, association module 1702 associates the search query with the user localities.

At step 1604, the users are assigned among a plurality of populations that corresponds to a plurality of respective population localities based on correlations between the user localities and the population localities. In an example implementation, assignment module 1704 assigns the users among the plurality of populations.

At step 2102 a determination is made that the users in a first population of the plurality of populations that corresponds to a first population locality are more likely to issue the search query than users in other populations of the plurality of populations. In an example implementation, localization determination module 1706' determines the users in the first population are more likely to issue the search query than users in other populations of the plurality of populations.

At step 1608, the search query is suggested to a first user having a first user locality based on the correlation between the first user locality and the first population locality. In an example implementation, suggestion module 1708 suggests the search query to the first user.

Figure 23:
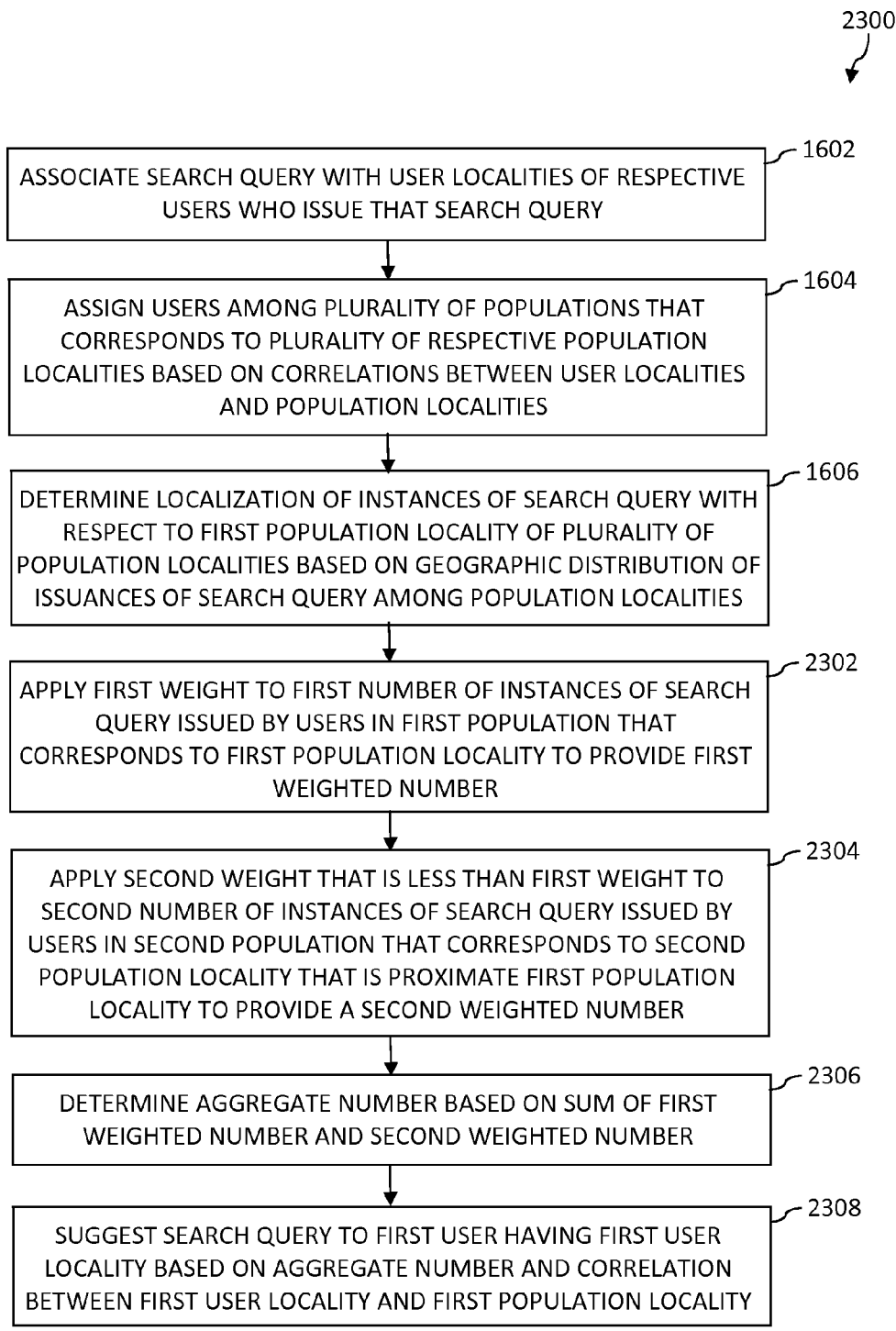

FIG. 23 depicts a flowchart 2300 of a method for providing locality-sensitive search suggestions in accordance with an embodiment described herein. Flowchart 2300 may be performed by any one or more of Web servers 106A-106N of computer system 100 shown in FIG. 1, for example. For illustrative purposes, flowchart 2300 is described with respect to a Web server 106'''''' shown in FIG. 24, which is an example of a Web server 106, according to an embodiment.

Figure 24:
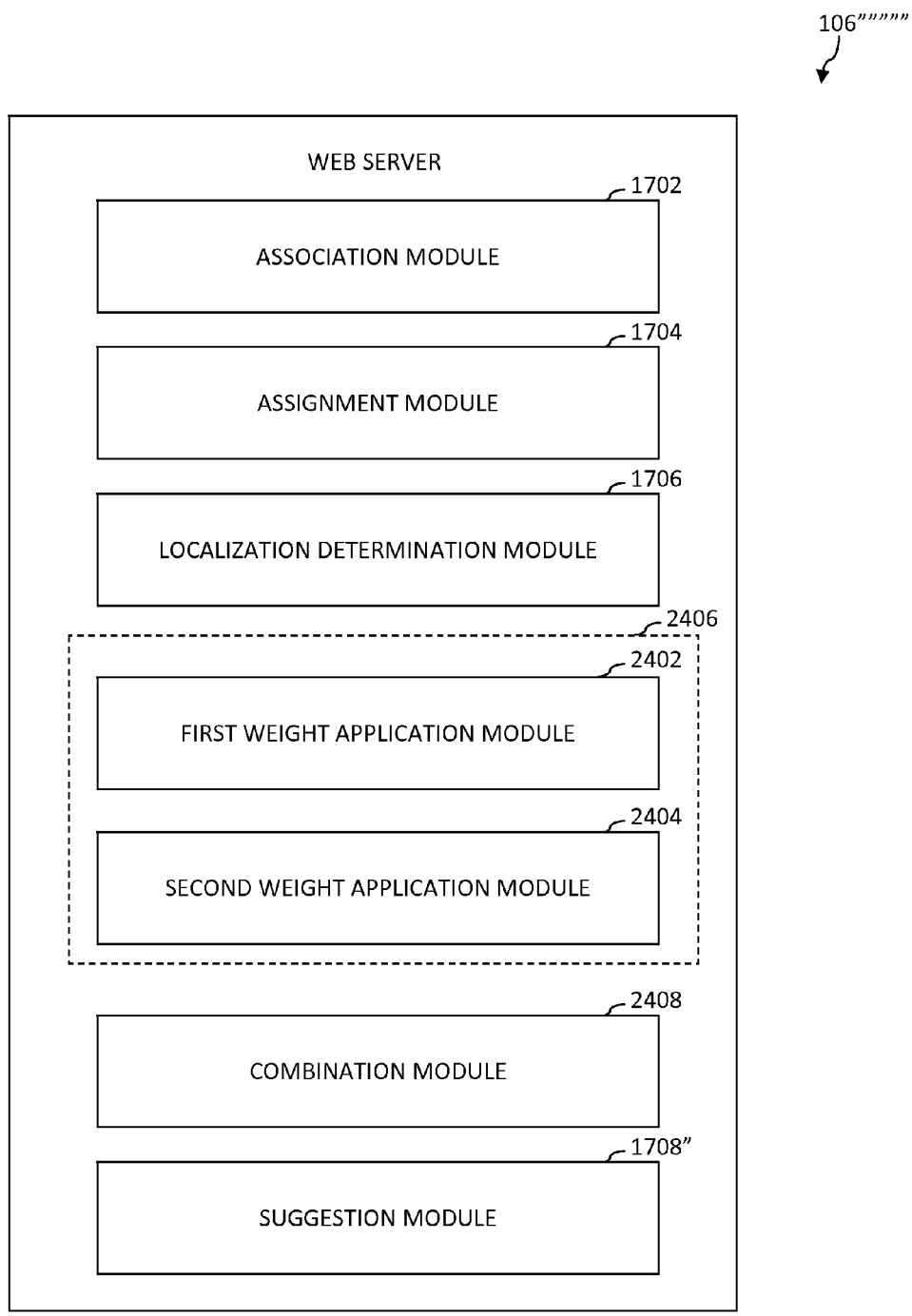

As shown in FIG. 24, Web server 106'''''' includes an association module 1702, an assignment module 1704, a localization determination module 1706, a first weight application module 2402, a second weight application module 2404, a combination module 2408, and a suggestion module 1708''. First weight application module 2402 and second weight application module 2404 may be combined into a common weight application module 2406, though the scope of the example embodiments is not limited in this respect. Further structural and operational embodiments will be apparent to persons skilled in the relevant art(s) based on the discussion regarding flowchart 2300. Flowchart 2300 is described as follows.

As shown in FIG. 23, the method of flowchart 2300 begins at step 1602. In step 1602, a search query is associated with user localities of respective users who issue that search query. In an example implementation, association module 1702 associates the search query with the user localities.

At step 1604, the users are assigned among a plurality of populations that corresponds to a plurality of respective population localities based on correlations between the user localities and the population localities. In an example implementation, assignment module 1704 assigns the users among the plurality of populations.

At step 1606, a localization of instances of the search query with respect to a first population locality of the plurality of population localities is determined based on a geographic distribution of the issuances of the search query among the population localities. In an example implementation, localization determination module 1706 determines the localization of the instances of the search query.

At step 2302, a first weight is applied to a first number of instances of the search query issued by users in a first population that corresponds to the first population locality to provide a first weighted number. In an example implementation, first weight application module 2302 applies the first weight to the first number of instances of the search query issued by the users in the first population.

At step 2304, a second weight that is less than the first weight is applied to a second number of instances of the search query issued by users in a second population that corresponds to a second population locality that is proximate the first population locality to provide a second weighted number. In an example implementation, second weight application module 2304 applies the second weight to the second number of instances of the search query issued by the users in the second population.

At step 2306, an aggregate number is determined based on a sum of the first weighted number and the second weighted number. In an example implementation, combination module 2408 determines the aggregate number.

At step 2308, the search query is suggested to a first user having a first user locality based on the aggregate number and the correlation between the first user locality and the first population locality. In an example implementation, suggestion module 1708" suggests the search query to the first user.

Figure 25:
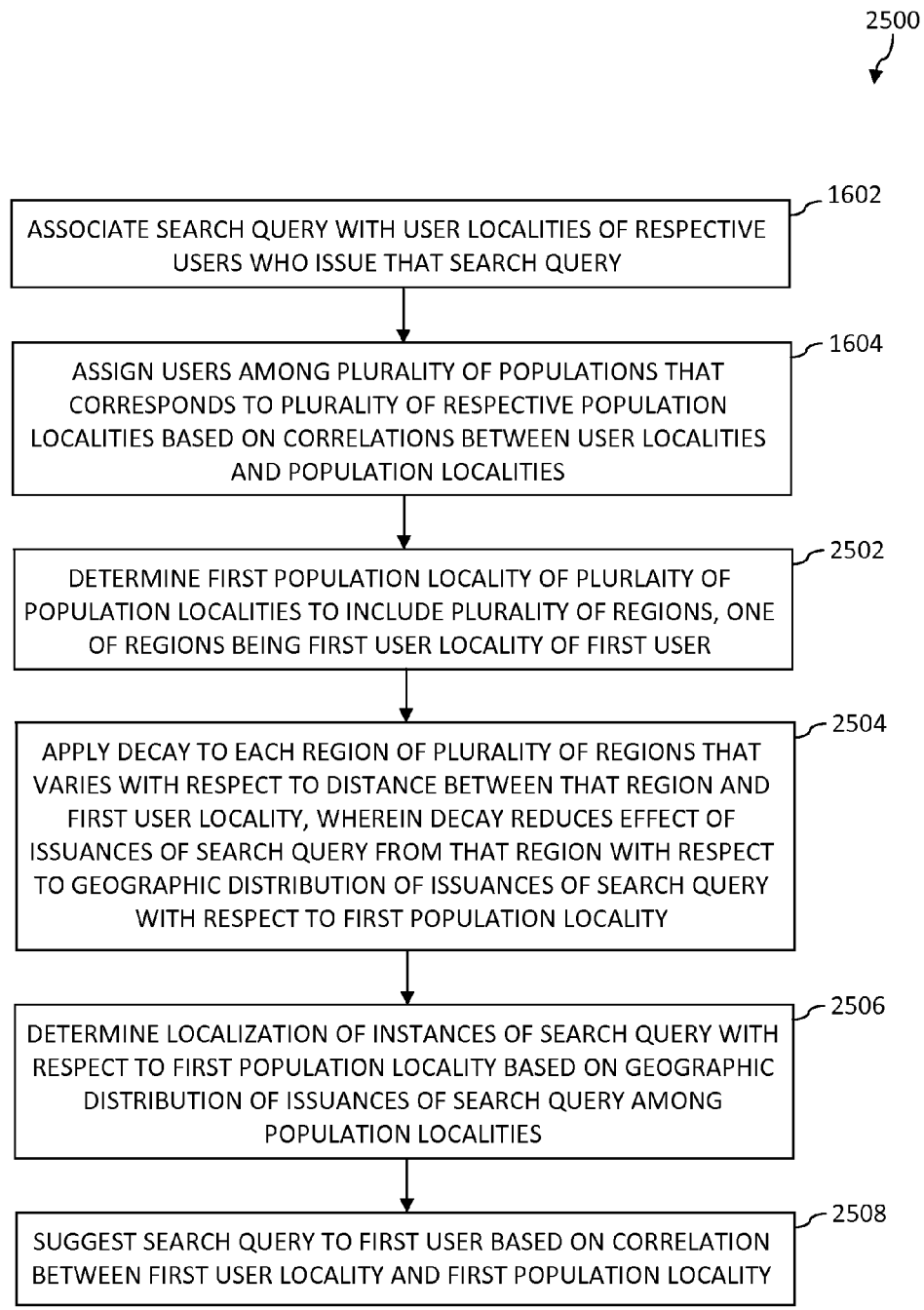

FIG. 25 depicts a flowchart 2500 of a method for providing locality-sensitive search suggestions in accordance with an embodiment described herein. Flowchart 2500 may be performed by any one or more of Web servers 106A-106N of computer system 100 shown in FIG. 1, for example. For illustrative purposes, flowchart 2500 is described with respect to a Web server 106'''''''' shown in FIG. 26, which is an example of a Web server 106, according to an embodiment.

Figure 26:
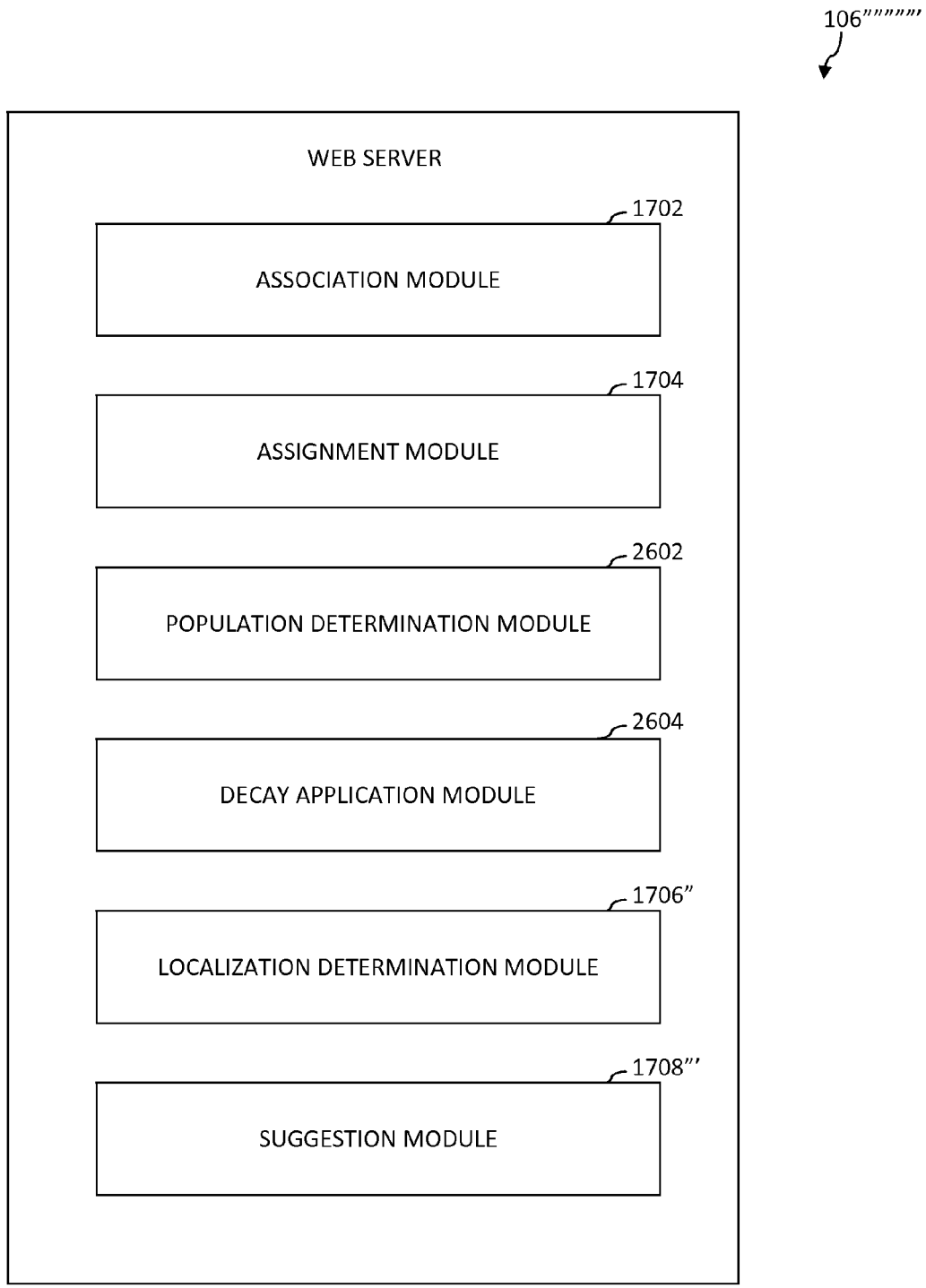

As shown in FIG. 26, Web server 106' includes an association module 1702, an assignment module 1704, a population determination module 2602, a decay application module 2604, a localization determination module 1706", and a suggestion module 1708'''. Further structural and operational embodiments will be apparent to persons skilled in the relevant art(s) based on the discussion regarding flowchart 2500. Flowchart 2500 is described as follows.

As shown in FIG. 25, the method of flowchart 2500 begins at step 1602. In step 1602, a search query is associated with user localities of respective users who issue that search query. In an example implementation, association module 1702 associates the search query with the user localities.

At step 1604, the users are assigned among a plurality of populations that corresponds to a plurality of respective population localities based on correlations between the user localities and the population localities. In an example implementation, assignment module 1704 assigns the users among the plurality of populations.

At step 2502, a first population locality of the plurality of population localities is determined to include a plurality of regions. One of the regions is a first user locality of a first user. In an example implementation, population determination module 2602 determines the first population locality to include the plurality of regions.

At step 2504, a decay is applied to each region of the plurality of regions that varies with respect to a distance between that region and the first user locality. The decay reduces an effect of issuances of the search query from that region with respect to a geographic distribution of issuances of the search query with respect to the first population locality. For example, a relatively greater distance between a region and the first user locality may result in a relatively greater decay being applied to the region. In accordance with this example, a relatively lesser distance between the region and the first user locality may result in a relatively lesser decay being applied to the region. In an example implementation, decay application module 2604 applies the decay to each region of the plurality of regions.

At step 2506, a localization of the instances of the search query with respect to the first population locality is determined based on a geographic distribution of the issuances of the search query among the population localities. In an example implementation, localization determination module 1706" determines the localization of the instances of the search query.

At step 2508, the search query is suggested to a first user based on the correlation between the first user locality and the first population locality. In an example implementation, suggestion module 1708''' suggests the search query to the first user.

It should be noted that Web search engine 108 of FIG. 1 may include association module 302, locality matching module 304, and/or suggestion module 308 of FIGS. 3, 7, 9, 11, 13, and 15; interest determination module 306 of FIGS. 3, 7, 9, 11, and 13; interest comparison module 702 of FIG. 7; query determination module 902 and/or query matching module 904 of FIG. 9; data determination module 1102 and/or perimeter extension module 1104 of FIG. 11; first weight application module 1302, second weight application module 1304, and/or weight application module 1306 of FIG. 13; interest combination module 1502 of FIG. 15; association module 1702, assignment module 1704, localization determination module 1706, and/or suggestion module 1708 of FIGS. 17, 19, 22, 24, and 26; query determination module 1902 and/or relevance determination module 1904 of FIG. 19; first weight application module 2402, second weight application module 2404, weight application module 2406, and/or combination module 2408 of FIG. 24; population determination module 2602 and/or decay application module 2604 of FIG. 26; or any portion or combination thereof, for example, though the scope of the embodiments is not limited in this respect.

Example embodiments have a variety of benefits as compared to conventional search suggestion techniques. For example, an a priori decision need not be made about whether a search suggestion is local or about the users who might be interested in the search suggestion. Rather, any such decisions may be made at the time that the search suggestions are determined. In another example, the locality-sensitive search suggestions may be more localized in scope with respect to a user's locality than traditional search suggestions. For instance, when the geographic distribution of issuances of search queries is sufficiently localized, the search suggestions that are provided based on that geographic distribution may amount to what is essentially a local search suggestion. Accordingly, the locality-sensitive search suggestions may be more likely to meet the needs of users than traditional search suggestions.

Search suggestions that are provided in accordance with one or more of the locality-sensitive search suggestion techniques described herein may be more relevant to a user than those that are based solely on the locality of the user. For purposes of illustration, assume that Tommy's Pizza is located down the street from a user, Jeff. However, people in the same general geographic area as Jeff prefer Lisa's Pizza, which is in the next town. The locality-sensitive search suggestion techniques described herein may recognize that the people in Jeff's general geographic area are likely to issue search queries regarding Lisa's Pizza rather than Tommy's Pizza. Accordingly, a search suggestion regarding Lisa's Pizza may be provided to Jeff when he initiates or issues a search query regarding pizza, for example.

Some example embodiments are capable of adapting a data set that is used for determining the search suggestions to encompass data regarding a greater or lesser geographic area. For example, reducing the data set to encompass data regarding a lesser geographic area may result in more localized and/or useful search suggestions. In another example, the data set may not include sufficient data to determine the likelihood of one or more search queries being issued by users in the corresponding geographic area (i.e., locality). In accordance with this example, the data set may be increased to encompass data regarding a greater geographic area.

In one aspect, the locality-sensitive search suggestions may be viewed as providing personalization and recommendation sharing of search queries in an implicit manner. For example, people in small towns generally may ask different questions than people in large cities. In another example, people from different localities may vacation in different parts of the world and/or have different entertainment choices. Being sensitive to these locality-based differences may allow more probable query suggestions to be provided to users.

III. Example Computer Implementation

Figure 27:
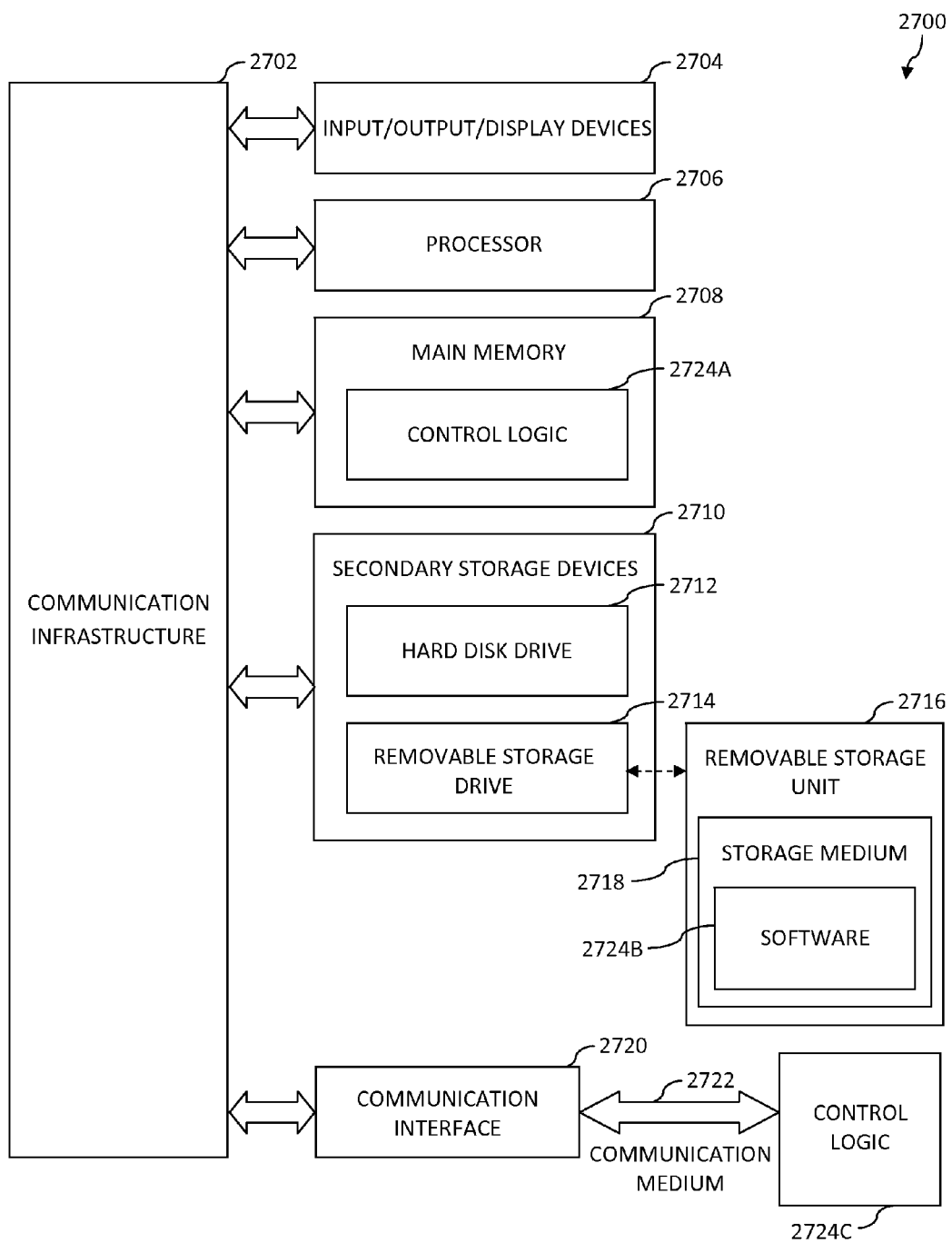
FIG. 27 is a block diagram of a computer in which embodiments may be implemented.

The embodiments described herein, including systems, methods/processes, and/or apparatuses, may be implemented using well known servers/computers, such as computer 2700 shown in FIG. 27. For example, elements of example computer system 100, including any of the user systems 102A-102M depicted in FIG. 1 and any of the Web servers 106A-106N depicted in FIGS. 1, 3, 7, 9, 11, 13, 15, 17, 19, 22, 24, and 26 and elements thereof, and each of the steps of flowcharts 200, 500, 600, 800, 1000, 1200, 1400, 1600, 1800, 2000, 2100, 2300, and 2500 depicted in respective FIGS. 2, 5, 6, 8, 10, 12, 14, 16, 18, 20, 21, 23, and 25 can each be implemented using one or more computers 2700.

Computer 2700 can be any commercially available and well known computer capable of performing the functions described herein, such as computers available from International Business Machines, Apple, Sun, HP, Dell, Cray, etc. Computer 2700 may be any type of computer, including a desktop computer, a server, etc.

As shown in FIG. 27, computer 2700 includes one or more processors (e.g., central processing units (CPUs)), such as processor 2706. Processor 2706 may include Web search engine 108 of FIG. 1; association module 302, locality matching module 304, and/or suggestion module 308 of FIGS. 3, 7, 9, 11, 13, and 15; interest determination module 306 of FIGS. 3, 7, 9, 11, and 13; interest comparison module 702 of FIG. 7; query determination module 902 and/or query matching module 904 of FIG. 9; data determination module 1102 and/or perimeter extension module 1104 of FIG. 11; first weight application module 1302, second weight application module 1304, and/or weight application module 1306 of FIG. 13; interest combination module 1502 of FIG. 15; association module 1702, assignment module 1704, localization determination module 1706, and/or suggestion module 1708 of FIGS. 17, 19, 22, 24, and 26; query determination module 1902 and/or relevance determination module 1904 of FIG. 19; first weight application module 2402, second weight application module 2404, weight application module 2406, and/or combination module 2408 of FIG. 24; population determination module 2602 and/or decay application module 2604 of FIG. 26; or any portion or combination thereof, for example, though the scope of the embodiments is not limited in this respect. Processor 2706 is connected to a communication infrastructure 2702, such as a communication bus. In some embodiments, processor 2706 can simultaneously operate multiple computing threads.

Computer 2700 also includes a primary or main memory 2708, such as a random access memory (RAM). Main memory has stored therein control logic 2724A (computer software), and data.

Computer 2700 also includes one or more secondary storage devices 2710. Secondary storage devices 2710 include, for example, a hard disk drive 2712 and/or a removable storage device or drive 2714, as well as other types of storage devices, such as memory cards and memory sticks. For instance, computer 2700 may include an industry standard interface, such as a universal serial bus (USB) interface for interfacing with devices such as a memory stick. Removable storage drive 2714 represents a floppy disk drive, a magnetic tape drive, a compact disk drive, an optical storage device, tape backup, etc.

Removable storage drive 2714 interacts with a removable storage unit 2716. Removable storage unit 2716 includes a computer useable or readable storage medium 2718 having stored therein computer software 2724B (control logic) and/or data. Removable storage unit 2716 represents a floppy disk, magnetic tape, compact disc (CD), digital versatile disc (DVD), Blue-ray disc, optical storage disk, memory stick, memory card, or any other computer data storage device. Removable storage drive 2714 reads from and/or writes to removable storage unit 2716 in a well known manner.

Computer 2700 also includes input/output/display devices 2704, such as monitors, keyboards, pointing devices, etc.

Computer 2700 further includes a communication or network interface 2720. Communication interface 2720 enables computer 2700 to communicate with remote devices. For example, communication interface 2720 allows computer 2700 to communicate over communication networks or mediums 2722 (representing a form of a computer useable or readable medium), such as local area networks (LANs), wide area networks (WANs), the Internet, etc. Network interface 2720 may interface with remote sites or networks via wired or wireless connections. Examples of communication interface 2722 include but are not limited to a modem, a network interface card (e.g., an Ethernet card), a communication port, a Personal Computer Memory Card International Association (PCMCIA) card, etc.

Control logic 2724C may be transmitted to and from computer 2700 via the communication medium 2722.

Any apparatus or manufacture comprising a computer useable or readable medium having control logic (software) stored therein is referred to herein as a computer program product or program storage device. This includes, but is not limited to, computer 2700, main memory 2708, secondary storage devices 2710, and removable storage unit 2716. Such computer program products, having control logic stored therein that, when executed by one or more data processing devices, cause such data processing devices to operate as described herein, represent embodiments of the invention.

For example, each of the elements of example Web servers 106A-106N, including Web search engine 108 depicted in FIG. 1; association module 302, locality matching module 304, and suggestion module 308, each depicted in FIGS. 3, 7, 9, 11, 13, and 15; interest determination module 306 depicted in FIGS. 3, 7, 9, 11, and 13; interest comparison module 702 depicted in FIG. 7; query determination module 902 and query matching module 904, each depicted in FIG. 9; data determination module 1102 and perimeter extension module 1104, each depicted in FIG. 11; first weight application module 1302, second weight application module 1304, and weight application module 1306, each depicted in FIG. 13; interest combination module 1502 depicted in FIG. 15; association module 1702, assignment module 1704, localization determination module 1706, and suggestion module 1708, each depicted in FIGS. 17, 19, 22, 24, and 26; query determination module 1902 and relevance determination module 1904, each depicted in FIG. 19; first weight application module 2402, second weight application module 2404, weight application module 2406, and combination module 2408, each depicted in FIG. 24; population determination module 2602 and decay application module 2604, each depicted in FIG. 26; and each of the steps of flowcharts 200, 500, 600, 800, 1000, 1200, 1400, 1600, 1800, 2000, 2100, 2300, and 2500 depicted in respective FIGS. 2, 5, 6, 8, 10, 12, 14, 16, 18, 20, 21, 23, and 25 can be implemented as control logic that may be stored on a computer useable medium or computer readable medium, which can be executed by one or more processors to operate as described herein.

The invention can be put into practice using software, hardware, and/or operating system implementations other than those described herein. Any software, hardware, and operating system implementations suitable for performing the functions described herein can be used.

IV. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method comprising:
    associating each search query of a plurality of search queries with user localities of respective users who issue that search query;
    matching the user localities to population localities of respective populations among which the users are distributed, said matching including matching a first user locality of a first user to a first population locality of a first population, the first population locality including a plurality of regions, one of the regions being the first user locality;
    determining, at a web server using one or more processors of the web server, for the first user locality, cumulative interest of the first population with respect to each search query, said determining including combining interests of users in each of the plurality of regions of the first population locality with respect to the search query based at least in part on a distance between each region and the first user locality, wherein the interests of the users in a region of the first population locality that is relatively farther from the first user locality is determined to have relatively less effect on the cumulative interest of the first population for the first user locality by, for each search query: applying a first weight to the cumulative interest of the first population to provide a first weighted cumulative interest for the search query;
    for each search query, applying a second weight less than the first weight to a cumulative interest of a second population that corresponds to a second population locality different from the first population locality to provide a second weighted cumulative interest for the search query; and
    suggesting at least some of the plurality of search queries to the first user based on a combination of the first weighted cumulative interest and the second weighted cumulative interest with respect to each of the at least some of the plurality of search queries.

2. The method of claim 1, wherein the suggesting the at least some of the plurality of search queries to the first user comprises:
    suggesting the at least some of the plurality of search queries to the first user in an order that is based on the cumulative interest of the users in the first population with respect to each of the at least some of the plurality of search queries.

3. The method of claim 1, further comprising:
    determining that the cumulative interest of the users in the first population with respect to each of the at least some of the plurality of search queries is greater than the cumulative interests of the users in other respective populations of the plurality of populations with respect to each of the at least some of the plurality of search queries;
    wherein suggesting the at least some of the plurality of search queries to the first user is performed in response to determining that the cumulative interest of the users in the first population with respect to each of the at least some of the plurality of search queries is greater than the cumulative interests of the users in other respective populations of the plurality of populations with respect to each of the at least some of the plurality of search queries.

4. The method of claim 1, further comprising:
    determining that the cumulative interest of the users in the first population with respect to each of the at least some of the plurality of search queries is greater than the cumulative interest of the users in the first population with respect to each of the other search queries of the plurality of search queries;

wherein suggesting the at least some of the plurality of search queries to the first user is performed in response to determining that the cumulative interest of the users in the first population with respect to each of the at least some of the plurality of search queries is greater than the cumulative interests of the users in the first population with respect to other search queries of the plurality of search queries.

5. The method of claim 1, further comprising:

determining that the first user provides a preliminary search query; and matching the preliminary search query to the at least some of the plurality of search queries;

wherein suggesting the at least some of the plurality of search queries is performed in response to matching the preliminary search query to the at least some of the plurality of search queries.

6. The method of claim 1, further comprising:

determining that insufficient data exists to determine the cumulative interest of the users in the first population with respect to a first search query of the plurality of search queries; and extending a perimeter of the first population locality to cause a number of users in the first population to increase;

wherein determining the cumulative interest of the users in each population with respect to each search query comprises:

determining the cumulative interest of the users in the first population with respect to the first search query in response to extending the perimeter of the first population locality.

7. The method of claim 1, wherein suggesting the at least some of the plurality of search queries to the first user comprises:

suggesting the at least some of the plurality of search queries to the first user in an order that is based on a sum of the first weighted cumulative interest of the first population with respect to each of the at least some of the plurality of search queries and the second weighted cumulative interest of the second population with respect to each of the at least some of the plurality of search queries.

8. The method of claim 1, wherein determining the cumulative interest of users in each population with respect to each search query includes one or more of determining a number of times that each search query is issued by the users in each population, determining a frequency with which the users in each population issue each search query, or determining a probability that each search query will be issued by users in each population.

9. A method comprising:

associating a search query with user localities of respective users who issue that search query;

assigning the users among a plurality of populations that corresponds to a plurality of respective population localities based on correlations between the user localities and the population localities;

determining, at a web server using one or more processors of the web server, a localization of instances of the search query with respect to a first population locality of the plurality of population localities based on a geographic distribution of the issuances of the search query among the population localities;

determining the first population locality to include a plurality of regions, each of the regions includes one or more user localities, one of the regions being a first user locality;

applying a decay to each of the plurality of regions, wherein the decay is determined based on a distance between that region and the first user locality, wherein, for the search query, interests of the users in a region of the first population locality that is relatively farther from the first user locality is determined to have relatively less effect on a cumulative interest of first population for the first user locality by:

determining, for the first user locality, the cumulative interest of the first population with respect to the search query, by combining interests of users in each of the plurality of regions of the first popularity locality with respect to the search query based at least in part on the decay;

applying a first weight to the cumulative interest of the first population to provide a first weighted cumulative interest for the search query;

applying a second weight less than the first weight to a cumulative interest of a second population that corresponds to a second population locality different from the first population locality to provide a second weighted cumulative interest for the search query; and suggesting the search query to a first user having the first user locality based on a combination of the first weighted cumulative interest and the second weighted cumulative interest with respect to the search query in response to determining the localization of the instances of the search query with respect to the first population locality.

10. The method of claim 9, further comprising:

determining that the first user provides a preliminary search query; and determining that the search query is relevant to the preliminary search query;

wherein the step of suggesting the search query is performed in response to determining that the search query is relevant to the preliminary search query.

11. The method of claim 10, wherein the step of determining the localization of the instances of the search query with respect to the first population locality comprises:

determining that the users in the first population of the plurality of populations that corresponds to the first population locality are more likely to issue the search query than other search queries that are relevant to the preliminary search query.

12. The method of claim 9, wherein the step of determining the localization of the instances of the search query with respect to the first population locality comprises:

determining that the users in the first population of the plurality of populations that corresponds to the first population locality are more likely to issue the search query than the users in other populations of the plurality of populations.

13. The method of claim 9, further comprising determining an aggregate number based on a sum of the first weighted cumulative interest and the second weighted cumulative interest;

wherein suggesting the search query to the first user comprises: suggesting the search query further based on the aggregate number.

14. The method of claim 9, wherein the decay reduces effect of the issuances of the search query from that region with respect to the geographic distribution of the issuances of the search query with respect to the first population locality.

15. A web server comprising:
one or more processors;
an association module, implemented using at least one of the one or more processors, configured to associate each search query of a plurality of search queries with user localities of respective users who issue that search query;
a locality matching module, implemented using at least one of the one or more processors, configured to match the user localities to population localities of respective populations among which the users are distributed, wherein a first user locality of a first user is matched to a first population locality of a first population, the first population locality including a plurality of regions, each region including one or more user localities, the plurality of regions including a first region that includes the first user locality;
an interest determination module, implemented using at least one of the one or more processors, configured to determine, for the first user locality, cumulative interest of the first population with respect to each search query, the interest determination module comprising a weight application module configured to apply a weight to the interests of the users with respect to each search query in each of the plurality of regions of the first population locality to provide a respective weighted cumulative interest, each weight associated with a respective region having a magnitude based on a distance between the respective region and the first region;
a weight application module, implemented using at least one of the one or more processors, configured to, for each search query,
apply a first weight to the cumulative interest of the first population to provide a first weighted cumulative interest so that the weighted cumulative interest of the users in a region of the first population locality that is relatively farther from the first region is determined to have relatively less effect on the cumulative interest of the first population, and
apply a second weight less than the first weight to a cumulative interest of a second population that corresponds to a second population locality different from the first population locality to provide a second weighted cumulative interest for the search query; and
a suggestion module, implemented using at least one of the one or more processors, configured to suggest at least some of the plurality of search queries to the first user based on a combination of the first weighted cumulative interest and the second weighted cumulative interest with respect to each of the at least some of the plurality of search queries.

16. The web server of claim 15, wherein the suggestion module is further configured to suggest the at least some of the plurality of search queries to the first user in an order that is based on the cumulative interest of the users in the first population with respect to each of the at least some of the plurality of search queries.

17. The web server of claim 15, further comprising:
an interest comparison module, implemented using at least one of the one or more processors, configured to determine whether the cumulative interest of the users in the first population with respect to each of the at least some of the plurality of search queries is greater than the cumulative interests of the users in other respective populations of the plurality of populations with respect to each of the at least some of the plurality of search queries;
wherein the suggestion module is configured to suggest the at least some of the plurality of search queries to the first user based on the cumulative interest of the users in the first population with respect to each of the at least some of the plurality of search queries being greater than the cumulative interests of the users in other respective populations of the plurality of populations with respect to each of the at least some of the plurality of search queries.

18. The web server of claim 15, further comprising:
an interest comparison module, implemented using at least one of the one or more processors, configured to determine whether the cumulative interest of the users in the first population with respect to each of the at least some of the plurality of search queries is greater than the cumulative interest of the users in the first population with respect to each of the other search queries of the plurality of search queries;
wherein the suggestion module is configured to suggest the at least some of the plurality of search queries to the first user based on the cumulative interest of the users in the first population with respect to each of the at least some of the plurality of search queries being greater than the cumulative interests of the users in the first population with respect to other search queries of the plurality of search queries.

19. The web server of claim 15, wherein the suggestion module is further configured to suggest the at least some of the plurality of search queries to the first user in an order that is based on a sum of the first weighted cumulative interest the first population with respect to each of the at least some of the plurality of search queries and the second weighted cumulative interest of the second population with respect to each of the at least some of the plurality of search queries.

20. The web server of claim 15, wherein the interest determination module further comprises:
a combination module, implemented using at least one of the one or more processors, configured to combine the weighted cumulative interest of the users in each region of the first population locality to determine the cumulative interest of the users in the first population.

21. The web server of claim 15, wherein the cumulative interest of the users in each region of the first population locality based on one or more of a number of times that each search query is issued by the users in the first population locality, a frequency with which the users in the first population locality issue each search query, or a probability that each search query will be issued by users in the first population locality.

* * * * *